(12) United States Patent
Kobayashi

(10) Patent No.: US 10,755,654 B2
(45) Date of Patent: Aug. 25, 2020

(54) IMAGE DISPLAY DEVICE AND IMAGE DISPLAY METHOD

(71) Applicant: SHARP KABUSHIKI KAISHA, Sakai, Osaka (JP)

(72) Inventor: Masamitsu Kobayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/221,194

(22) Filed: Dec. 14, 2018

(65) Prior Publication Data

US 2019/0213964 A1 Jul. 11, 2019

(30) Foreign Application Priority Data

Jan. 10, 2018 (JP) .................................. 2018-001897

(51) Int. Cl.
*G09G 3/36* (2006.01)
*G02F 1/133* (2006.01)
*G02B 27/01* (2006.01)

(52) U.S. Cl.
CPC ........ *G09G 3/3607* (2013.01); *G02F 1/13306* (2013.01); *G02B 27/0172* (2013.01); *G09G 2300/0452* (2013.01); *G09G 2310/08* (2013.01); *G09G 2340/0457* (2013.01)

(58) Field of Classification Search
CPC .... G02B 2027/0147; G02B 2027/0145; G02B 27/0172; G09G 2340/0428; G09G 2340/0407; G09G 5/391; G09G 2300/0452; G09G 2340/0457; G09G 3/3607; G09G 2310/08; G06T 3/40; G06F 3/147; G02F 1/13306
See application file for complete search history.

(56) References Cited

U.S. PATENT DOCUMENTS

2014/0266990 A1 9/2014 Makino et al.
2018/0137602 A1* 5/2018 Spitzer .................. G06T 3/4007

FOREIGN PATENT DOCUMENTS

JP 2007-094089 A 4/2007
WO 2013/076994 A1 5/2013

* cited by examiner

*Primary Examiner* — Robert J Michaud
(74) *Attorney, Agent, or Firm* — ScienBiziP, P.C.

(57) ABSTRACT

An image display device includes a display panel having a uniform resolution, an image data conversion unit for converting first image data including a plurality of pieces of pixel data to second image data including a smaller number of pieces of pixel data, and a drive circuit for driving the display panel based on the second image data. The display panel has a first region in which one piece of the pixel data is written to one pixel and a second region in which one piece of the pixel data is written to two or more pixels, and has a third region and a fourth region. The image data conversion unit performs a calculation on the pixel data of the pixel in the fourth region, the calculation performed in accordance with a distance of the pixel from a reference position, and does not perform the calculation on the pixel data of the pixel in the third region.

18 Claims, 16 Drawing Sheets

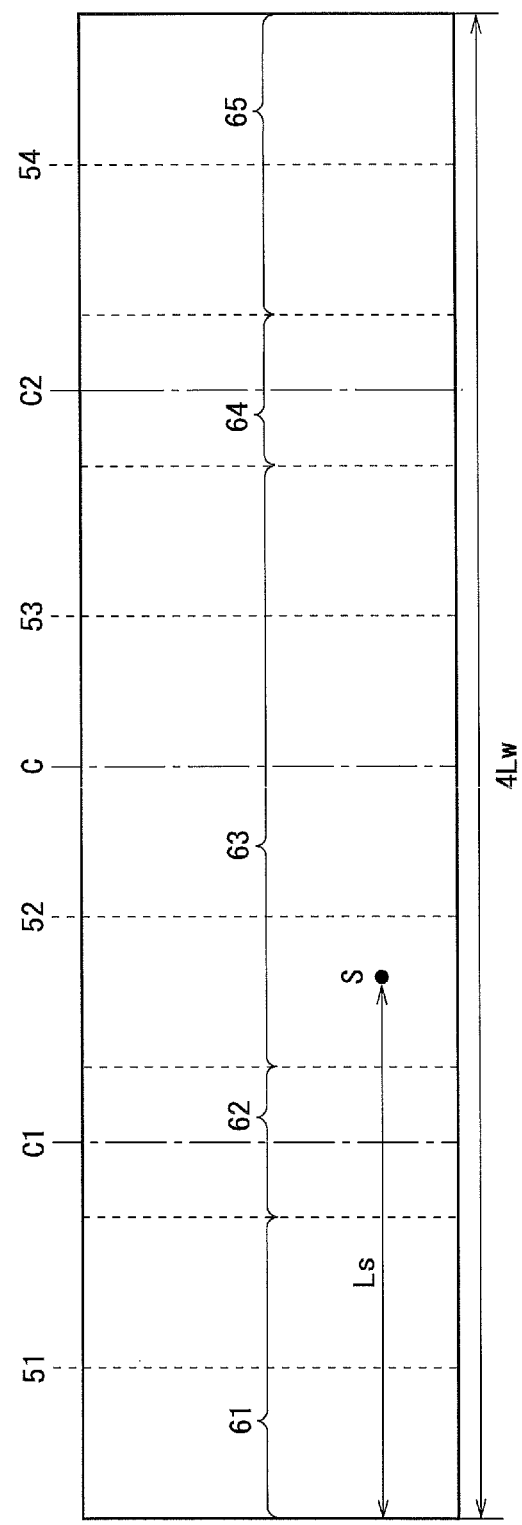

IMAGE DISPLAY DEVICE AND IMAGE DISPLAY METHOD

BACKGROUND OF THE INVENTION

Field of the Invention

The present invention relates to an image display device and an image display method.

Description of Related Art

A liquid crystal display device is widely used as a thin, light-weight, and low power consumption image display device. The liquid crystal display device is also used, for example, in a head mount display (hereinafter referred to as an HMD). In the HMD using a liquid crystal panel, the liquid crystal panel displays a left-eye image and a right-eye image in a time division manner or in a region division manner. With this, it is possible for a user who puts on the HMD to see a three-dimensional image.

In the HMD using a low-resolution liquid crystal panel, there occurs a phenomenon called "screen door" in which a display screen is seen in a lattice form. Thus, the liquid crystal panel for the HMD is required to have a high resolution. Furthermore, in the HMD using a high-resolution liquid crystal panel, an amount of data to be transferred to the liquid crystal panel increases, and time and power consumption necessary for data transmission increase. Thus, in the HMD using the high-resolution liquid crystal panel, it is required to reduce the amount of data to be transferred to the liquid crystal panel.

Since lenses are placed on the liquid crystal panel in the HMD, the user sees a surrounding portion of the display screen in a reduced manner. Using this property, there is known an image display device using a display panel in which a resolution in the surrounding portion is lower than the resolution in a center portion to reduce the amount of data to be transferred to the display panel. For example, Japanese Laid-Open Patent Publication No. 2007-94089 discloses a display panel shown in FIG. 15 and having a high-resolution display region 101 and a low-resolution display region 102. International Publication No. 2013/76994 discloses a display panel shown in FIG. 16, in which the resolution in the surrounding portion is lower than the resolution in the center portion.

However, when an image display device is configured using a display panel in which the resolution in the surrounding portion is lower than the resolution in the center portion, design and manufacturing of the display panel become difficult, because a pixel itch and a color filter size change depending on a position. On the contrary, when an image display device of which resolution of the display screen recognized by the user changes depending on the position is configured using a display panel having a uniform resolution, there occurs a problem that a boundary is recognized visually at a position where the resolution of the display screen changes.

SUMMARY OF THE INVENTION

Therefore, providing an image display device including a display panel having a uniform resolution and preventing a boundary from being recognized visually at a position where a resolution of a display screen changes is taken as a problem.

The above-described problem can be solved by an image display device including: a display panel including a plurality of pixels arranged two-dimensionally and having a uniform resolution; an image data conversion unit configured to convert first image data including a plurality of pieces of pixel data to second image data including a smaller number of pieces of pixel data than the first image data; and a drive circuit configured to drive the display panel based on the second image data, wherein the display panel has a first region in which one piece of the pixel data is written to one pixel and a second region in which one piece of the pixel data is written to two or more pixels, and has a third region and a fourth region, and the image data conversion unit is configured to perform a calculation on the pixel data of the pixel in the fourth region, the calculation performed in accordance with a distance of the pixel from a reference position, and is configured not to perform the calculation on the pixel data of the pixel in the third region.

The above-described problem can be also solved by an image display method using a display panel including a plurality of pixels arranged two-dimensionally and having a uniform resolution, the method including: converting first image data including a plurality of pieces of pixel data to second image data including a smaller number of pieces of pixel data than the first image data; driving the display panel based on the second image data, wherein the display panel has a first region in which one piece of the pixel data is written to one pixel and a second region in which one piece of the pixel data is written to two or more pixels, and has a third region and a fourth region, and in converting, a calculation is performed on the pixel data of the pixel in the fourth region, the calculation performed in accordance with a distance of the pixel from a reference position, and the calculation is not performed on the pixel data of the pixel in the third region.

According to the above-described image display device and image display method, when a region in which one piece of pixel data is written to one pixel and a region in which one piece of pixel data is written to two or more pixels are provided to the display panel having the uniform resolution and a resolution of a display screen recognized by a user is made to change, it is possible to prevent the second image data written to the pixel from changing greatly at a position where the resolution of the display screen changes, while displaying based on the original first image data in a part of the display screen, by performing the calculation on the pixel data of the pixel in the fourth region, the calculation performed in accordance with the distance of the pixel from the reference position, and not performing the calculation on the pixel data of the pixel in the third region. Therefore, it is possible to prevent a boundary from being recognized visually at the position where the resolution of the display screen changes, using the display panel having the uniform resolution.

These and other objects, features, modes and effects of the present invention will be more apparent from the following detailed description with reference to the attached drawings.

BRIEF DESCRIPTION OF THE DRAWINGS

FIG. 8 is a diagram showing a region division of a liquid crystal panel in an image display device according to a third embodiment.

DETAILED DESCRIPTION OF THE INVENTION

First Embodiment

Figure 1:
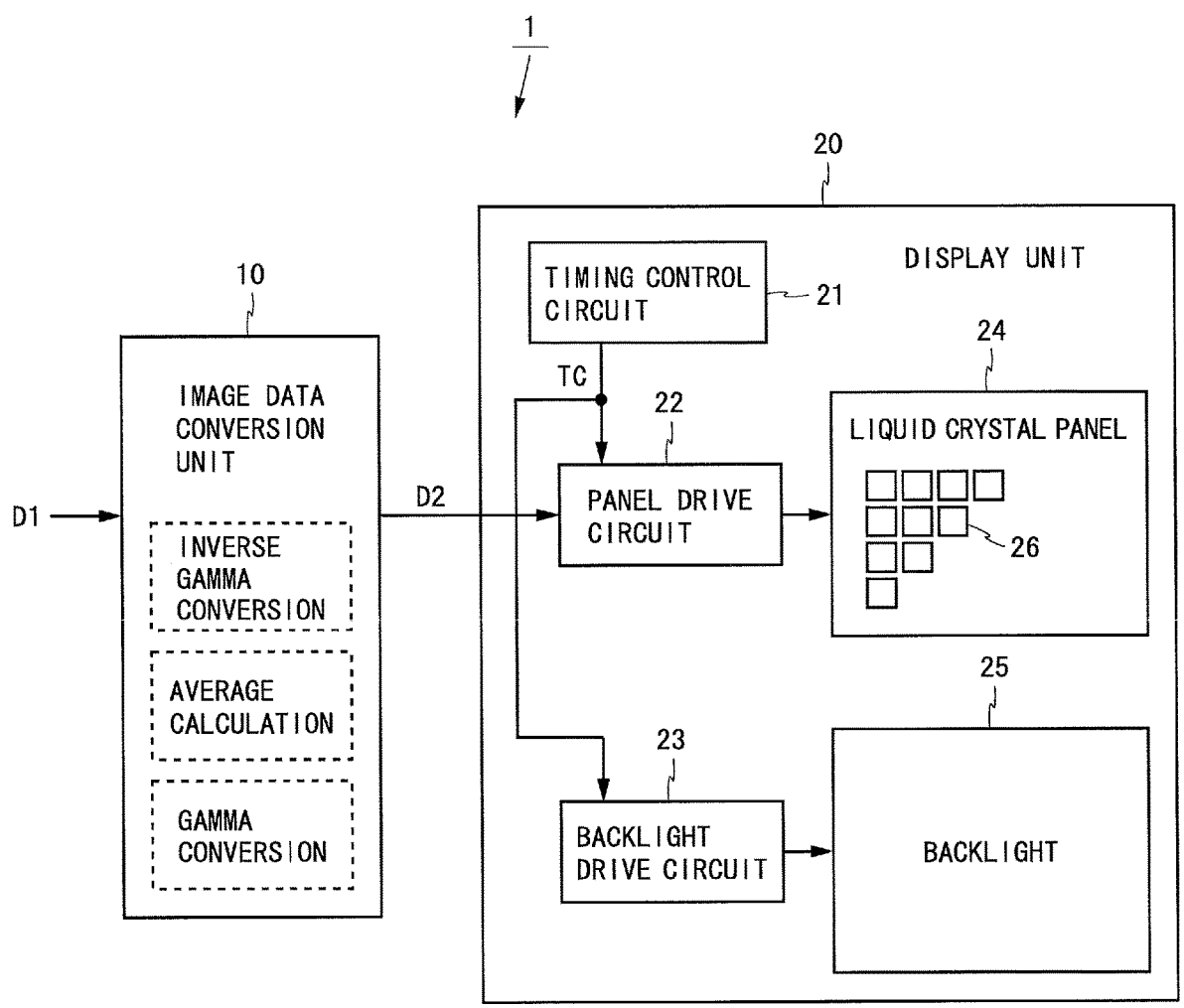
FIG. 1 is a block diagram showing a configuration of an image display device according to a first embodiment.

FIG. 1 is a block diagram showing a configuration of an image display device according to a first embodiment. An image display device 1 shown in FIG. 1 is a liquid crystal display device including an image data conversion unit 10 and a display unit 20. The display unit 20 includes a timing control circuit 21, a panel drive circuit 22, a backlight drive circuit 23, a liquid crystal panel 24, and a backlight 25.

The liquid crystal panel 24 includes a plurality of pixels 26 arranged two-dimensionally. The plurality of pixels 26 are arranged with a constant pitch (interval) in a horizontal direction and a vertical direction. The pitch in the horizontal direction and the pitch in the vertical direction may be same or may be different. The liquid crystal panel 24 has a uniform resolution irrespective of a position.

Image data D1 including a plurality of pieces of pixel data is input to the image data conversion unit 10 (here, the pixel data is image data corresponding to one pixel). The image data conversion unit 10 performs an average calculation (details will be described later) on a part of the pixel data included in the image data D1 (pixel data of pixels in a surrounding portion of a display screen), and outputs image data D2 including pixel data after the average calculation. A number of pieces of the pixel data included in the image data D2 is smaller than a number of pieces of the pixel data included in the image data D1. In this manner, the image data conversion unit 10 converts the image data D1 to the image data D2 including a smaller number of pieces of pixel data.

The image data conversion unit 10 performs an inverse gamma conversion on the pixel data included in the image data D1, performs the average calculation on pixel data after the inverse gamma conversion, and performs a gamma conversion on pixel data after the average calculation. Note that in order to reduce a circuit amount, the image data conversions unit 10 may perform the average calculation on the pixel data included in the image data D1 without performing the inverse gamma conversion and the gamma conversion.

The timing control circuit 21 outputs a timing control signal TC to the panel drive circuit 22 and the backlight drive circuit 23. The backlight drive circuit 23 drives the backlight 25 based on the timing control signal TC. The backlight 25 is placed on a back surface side of the liquid crystal panel 24, and irradiates a back surface of the liquid crystal panel 24 with light.

The panel drive circuit 22 drives the liquid crystal panel 24 based on the timing control signal TC and the image data D2. The panel drive circuit 22 writes the pixel data included in the image data D2 to the pixel 26. Transmittance of the pixel 26 changes in accordance with the written pixel data. When intensity of light output from the backlight 25 is constant, brightness of the pixel 26 changes in accordance with the transmittance of the pixel 26. It is possible to display a desired image on the liquid crystal panel 24 by writing the pixel data to all of the pixels 26 in the liquid crystal panel 24 using the panel drive circuit 22.

Figure 2:
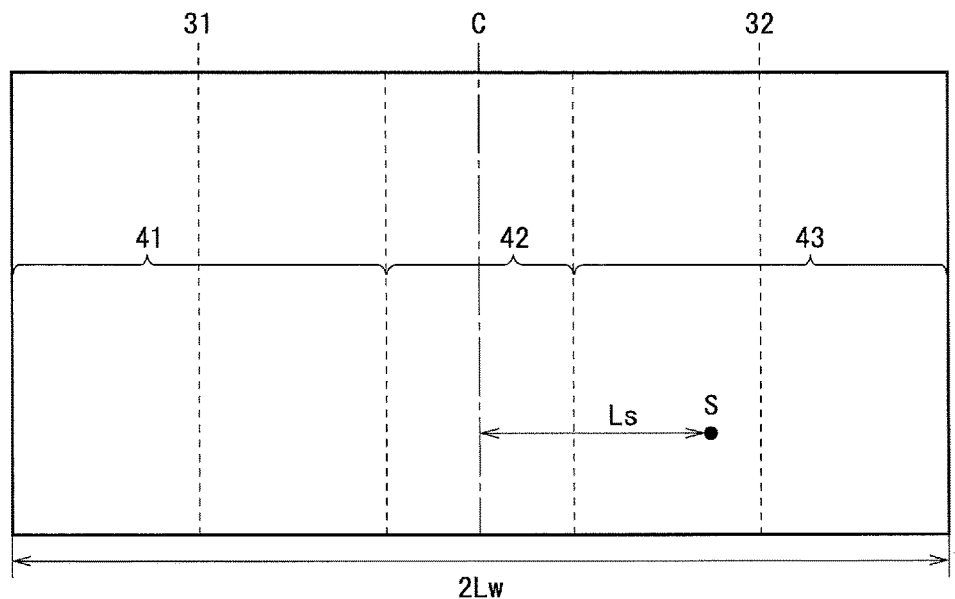
FIG. 2 is a diagram showing a region division of a liquid crystal panel in the image display device according to the first embodiment.

FIG. 2 is a diagram showing a region division of the liquid crystal panel 24. In the following, it is assumed that a size in the horizontal direction of the liquid crystal panel 24 is 2Lw, and a center position in the horizontal direction of the liquid crystal panel 24 is referred to as a screen center C. When a position S in the liquid crystal panel 24 is apart from the screen center by a distance Ls, (Ls/Lw) is referred to as "distance from screen center" of the position S, and is denoted by X. A range of values that a distance X from the screen center can take is 0≤X≤1.

The liquid crystal panel 24 has a boundary line 31 at a position apart leftward from the screen center C by a predetermined distance, and has a boundary line 32 at a position apart rightward from the screen center C by the same distance. The boundary lines 31, 32 are set at positions where the distance X from the screen center is 0.6. In the present embodiment, a portion interposed between the boundary lines 31, 32 is a one-to-one region, and a left-side portion of the boundary line 31 and a right-side portion of the boundary line 32 are one-to-two regions.

The liquid crystal panel 24 is configured so that one piece of the pixel data is written to one pixel 26 in the one-to-one region, and one piece of the pixel data is written to two pixels 26 adjacent in the horizontal direction in the one-to-two region. In the one-to-two region, every two data lines are connected to a same external terminal. In the liquid crystal panel 24, a number of the pixel(s) 26 to which one piece of the pixel data is written changes in two steps in the horizontal direction.

Apart from this, the liquid crystal panel 24 has a left-side region 41, a center region 42, and a right-side region 43. The image data conversion unit 10 does not perform the average calculation on the pixel data included in the image data D1, with respect to the pixel 26 in the center region 42. The panel drive circuit 22 writes the pixel data on which the average calculation is not performed, to the pixel 26 in the center region 42. The image data conversion unit 10 performs the average calculation on the pixel data included in the image data D1, with respect to the pixel 26 in the left-side region 41 and the right-side region 43. The panel drive circuit 22 writes the pixel data after the average calculation, to the pixel 26 in the left-side region 41 and the right-side region 43.

Figure 3:
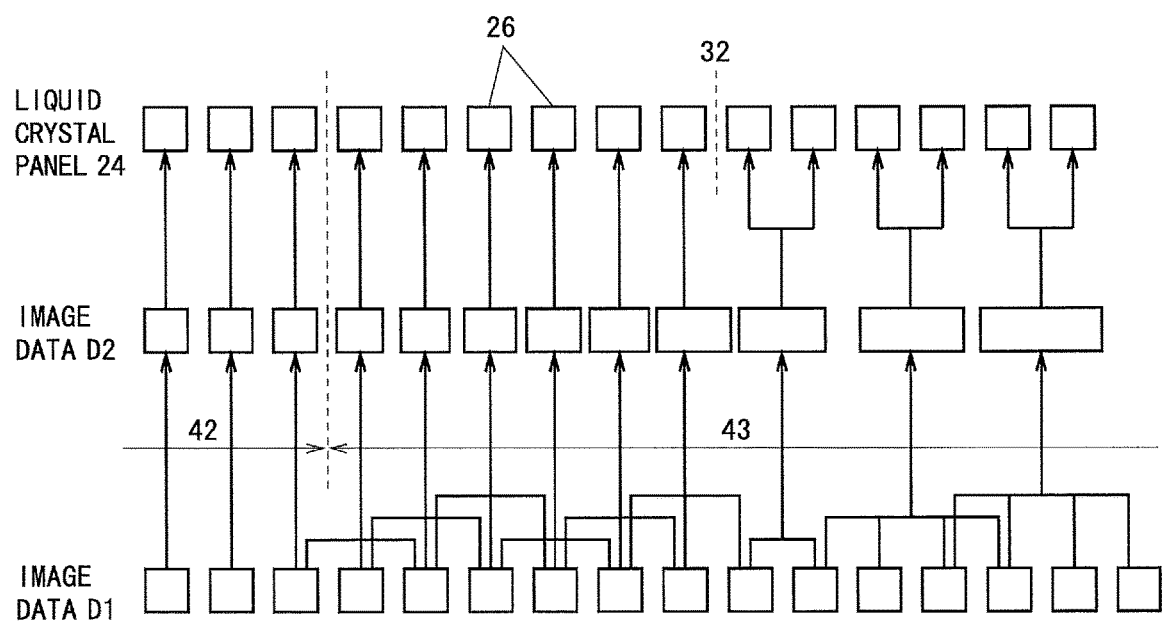
FIG. 3 is a diagram showing a correspondence relationship between pixel data and pixels in the image display device according to the first embodiment.

FIG. 3 is a diagram showing a corresponding relationship between the pixel data and the pixels 26. A rectangle depicted in a lower section of FIG. 3 represents the pixel data included in the image data D1. A rectangle depicted in a middle section of FIG. 3 represents the pixel data included in the image data D2. A width of the rectangle represents a number of lines to be described later. A rectangle depicted in an upper section of FIG. 3 represents the pixel 26 included in the liquid crystal panel 24.

The image data conversion unit 10 performs following processing on the pixel data of a pixel P included in the image data D1. First, the image data conversion unit 10 obtains the distance X of the pixel P from the screen center.

Next, the image data conversion unit 10 obtains a characterizing value (hereinafter referred to as a number Y of lines) to be used in the average calculation, based on the distance X from the screen center. The number Y of lines relates to a number of pieces of calculation target pixel data (in other words, a number of pieces of the pixel data used in the average calculation), and has a fractional part (hereinafter referred to as a decimal part). Next, the image data conversion unit 10 performs the average calculation in accordance with the number Y of lines, on the pixel data of the pixel P and the pixel data of the pixels 26 in a same row as the pixel P.

Figure 4A:
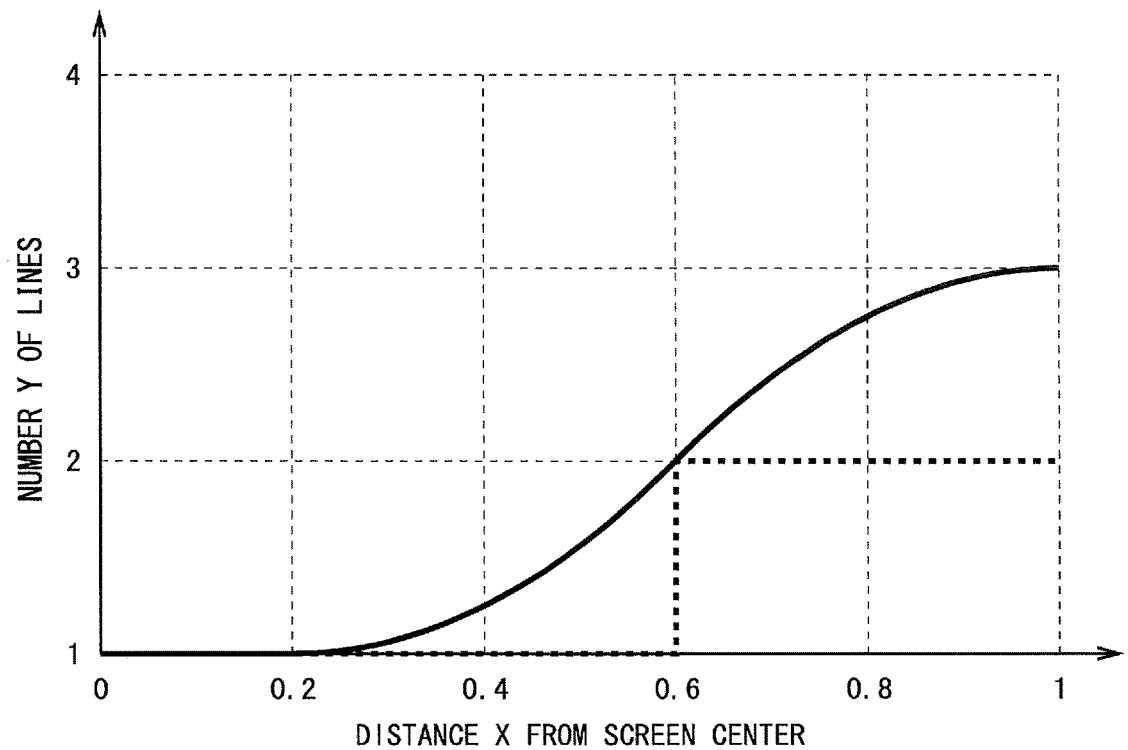
FIG. 4A is a diagram showing a relationship (first example) between a distance from a screen center and a number of lines in the image display device according to the first embodiment.

The average calculation performed by the image data conversion unit 10 is characterized by a function for obtaining the number Y of lines based on the distance X from the screen center, and the image data conversion unit 10 obtains the number Y of lines using the function. The image data conversion unit 10 may obtain the number Y of lines based on the distance X from the screen center, for example, using a following function F11 (first example). In this case, the number Y of lines changes in accordance with the distance X from the screen center as shown in FIG. 4A. The center region 42 is a region in which the distance X from the screen center is not larger than 0.2. Note that a thick broken line depicted in the drawings showing a change of the number Y of lines indicates a number of the pixel(s) 26 to which a same pixel data is written.

$Y=1$ (when $X≤0.2$)

$Y=6.25(X-0.2)^2+1$ (when $0.2<X≤0.6$)

Figure 4B:
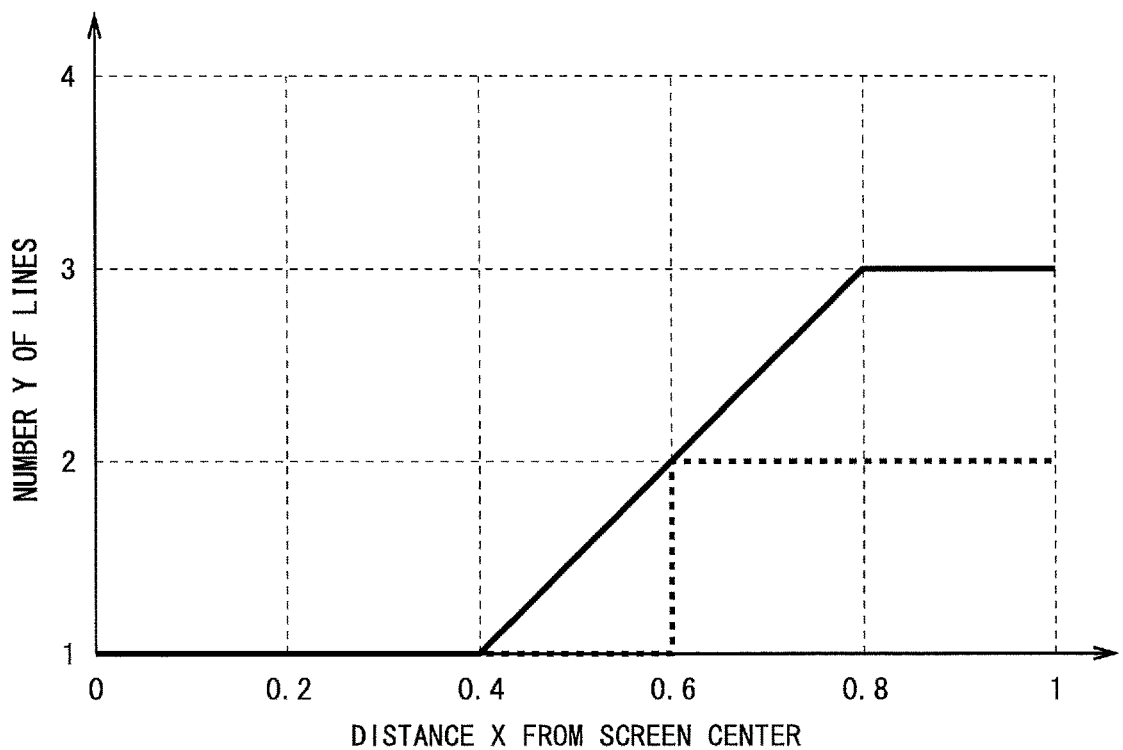
FIG. 4B is a diagram showing a relationship (second example) between the distance from the screen center and the number of lines in the image display device according to the first embodiment.

$Y=-6.25(X-1)^2+3$ (when $X>0.6$)   function F11:

The image data conversion unit 10 may obtain the number Y of lines based on the distance X from the screen center using a following function F12 (second example). In this case, the number Y of lines changes in accordance with the distance X from the screen center as shown in FIG. 4B. The center region 42 is a region in which the distance X from the screen center is not larger than 0.4.

$Y=1$ (when $X≤0.4$)

$Y=5X-1$ (when $0.4<X≤0.8$)

$Y=3$ (where $X>0.8$)   function F12:

The functions F11 and F12 are continuous within the range of values ($0≤X≤1$) that the distance X from the screen center can take. The value of the function F11 is larger than 1 with respect to a part of the pixels in the one-to-one region (pixel satisfying $0.2<X≤0.6$). The value of the function F12 is larger than 1 with respect to a part of the pixels in the one-to-one region (pixel satisfying $0.4<X≤0.6$). The values of the functions F11 and F12 are equal to or larger than 2 (that is, equal to or larger than a number of pixels to which the same pixel data as that written to the pixel is written) with respect to the pixel in the one-to-two region (pixel satisfying $X>0.6$).

The function $Y=6.25 (X-0.2)^2+1$ changes smoothly within a range of $0.2<X<0.6$. The function $Y=-6.25(X-1)^2+3$ changes smoothly within a range of $0.6<X<1$. At $X=0.2$, a left-hand derivative of the function $Y=6.25 (X-0.2)^2+1$ is equal to a right-hand derivative of the function $Y=1$. At $X=0.6$, a right-hand derivative of the function $Y=6.25(X-0.2)^2+1$ is equal to a left-hand derivative of the function $Y=-6.25(X-1)^2+1$. Therefore, the function F11 changes smoothly within the range of values that the distance X from the screen center can take. The function F12 does not change smoothly at X=0.4 and X=0.8. However, the number Y of lines can be obtained easily based on the distance X from the screen center by using the function F12.

Figure 5A:
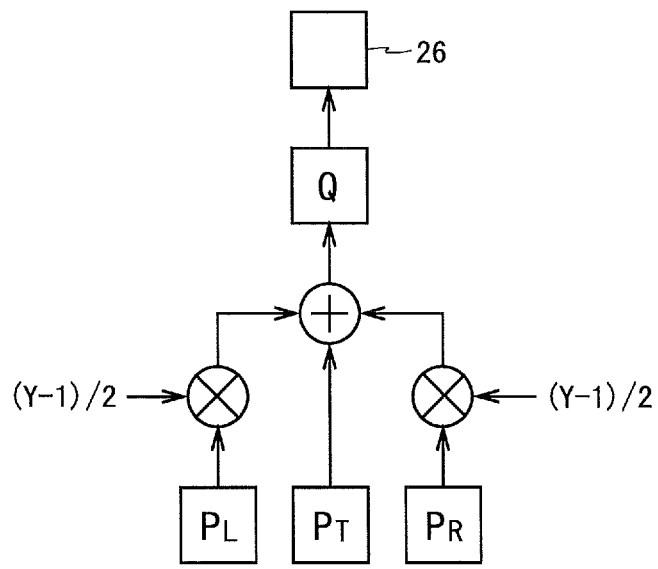
FIG. 5A is a diagram showing an average calculation (first example) in the image display device according to the first embodiment.

In the one-to-one region (portion interposed between boundary lines 31, 32), the pixel data included in the image data D2 is written to one pixel 26 (hereinafter referred to as a target pixel) of the liquid crystal panel 24. Furthermore, 1≤Y≤2 is satisfied in this region. In this case, the image data conversion unit 10 performs the average calculation in accordance with following equations (1) and (2) (refer to FIG. 5A).

$$k=(Y-1)/2 \quad (1)$$

$$Q=(kP_L+P_T+kP_R)/Y \quad (2)$$

Here, in the equation (2), $P_T$ is the pixel data of the target pixel, $P_L$ is the pixel data of a left adjacent pixel of the target pixel, $P_R$ is the pixel data of a right adjacent pixel of the target pixel, and Q is the pixel data of the target pixel after the average calculation.

Figure 5B:
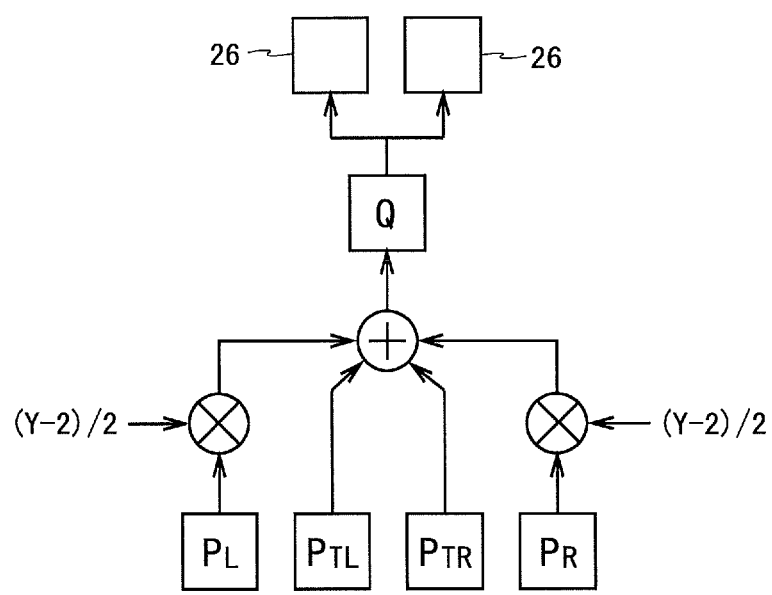
FIG. 5B is a diagram showing an average calculation (second example) in the image display device according to the first embodiment.

In the one-to-two region (left-side portion of boundary line 31 and right-side portion of boundary line 32), the pixel data included in the image data D2 is written to two pixels 26 adjacent in the horizontal direction (hereinafter referred to as a left target pixel and a right target pixel in order from left to right) of the liquid crystal panel 24. Furthermore, 2<Y≤3 is satisfied in this region. In this case, the image data conversion unit 10 performs the average calculation in accordance with following equations (3) and (4) (refer to FIG. 5B).

$$k=(Y-2)/2 \quad (3)$$

$$Q=(kP_L+P_{TL}+P_{TR}+kP_R)/Y \quad (4)$$

Here, in the equation (4), $P_{TL}$ is the pixel data of the left target pixel, $P_{TR}$ is the pixel data of the right target pixel, $P_L$ is the pixel data of a left adjacent pixel of the left target pixel, and $P_R$ is the pixel data of a right adjacent pixel of the right target pixel.

For example, when Y=1, a following equation (5a) is derived from the equation (2). When Y=1.6, a following equation (5b) is derived from the equation (2). When Y=2.4, a following equation (5c) is derived from the equation (4). When Y=3, a following equation (5d) is derived from the equation (4). Note that the image data conversion unit 10 does not perform the average calculation when Y=1.

$$Q=P_T \quad (5a)$$

$$Q=(0.3P_L+P_T+0.3P_R)/1.6 \quad (5b)$$

$$Q=(0.2P_L+P_{TL}+P_{TR}+0.2P_R)/2.4 \quad (5c)$$

$$Q=(0.5P_L+P_{TL}+P_{TR}+0.5P_R)/3 \quad (5d)$$

In this manner, when an integer part of the number Y of lines is Ya and the decimal part of the number Y of lines is Yb, the image data conversion unit 10 performs, as the average calculation, a calculation of adding the pixel data of Ya piece(s) of pixel(s) 26 aligned in the horizontal direction, a product of the pixel data of the left adjacent pixel of the Ya pieces(s) of pixel(s) 26 and (Yb/2), and a product of the pixel data of the right adjacent pixel of the Ya pieces(s) of pixel(s) 26 and (Yb/2), and dividing an obtained sum by the number Y of lines.

Note that the image data conversion unit 10 may perform a weighted average calculation in accordance with distances between pixels, instead of the above-mentioned average calculation. In general, when the integer part of the number Y of lines is Ya, it is enough that the image data conversion unit 10 performs a calculation based on the number Y of lines on the pixel data of the Ya piece(s) of pixel(s) 26 aligned in the horizontal direction and the pixel data of two pixels adjacent to the Ya piece(s) of pixel(s) 26 in the horizontal direction.

In the image display device 1, a region in which one piece of the pixel data is written to one pixel 26 and a region in which one piece of the pixel data is written to two pixels 26 are provided to the liquid crystal panel 24 having the uniform resolution. Thus, a resolution of the display screen recognized by the user changes depending on a position. As described above, when an image display device in which the resolution of the display screen changes depending on the position is configured using a liquid crystal panel having a uniform resolution, there occurs a problem that a boundary is recognized visually at a position where the resolution of the display screen changes unless any special contrivance is adopted.

The image data conversion unit 10 performs, on the pixel data of the pixel 26 in the left-side region 41 and the right-side region 43, the calculation in accordance with the distance X of the pixel from the screen center, and does not perform the calculation on the pixel data of the pixel 26 in the center region 42. Therefore, it is possible to prevent the image data D2 written to the pixel 26 from changing greatly at a position where the resolution of the display screen changes, while displaying based on the original image data D1 in a part of the display screen. Therefore, it is possible to prevent the boundary from being recognized visually at the position where the resolution of the display screen changes, using the liquid crystal panel 24 having the uniform resolution.

As described above, the image display device 1 according to the present embodiment includes a display panel (liquid crystal panel 24) including the plurality of pixels 26 arranged two-dimensionally and having the uniform resolution, the image data conversion unit 10 for converting first image data (image data D1) including the plurality of pieces of pixel data to second image data (image data D2) including the smaller number of pixel data than the first image data, and a drive circuit (panel drive circuit 22) for driving the display panel based on the second image data. The display panel has a first region (one-to-one region) in which one piece of the pixel data is written to one pixel 26 and a second region (one-to-two region) in which one piece of the pixel data is written to two pixels 26, and has a third region (center region 42) and a fourth region (left-side region 41 and right-side region 43). The image data conversion unit 10 performs a calculation on the pixel data of the pixel in the fourth region, the calculation performed in accordance with a distance of the pixel from a reference position (distance X from screen center), and does not perform the calculation on the pixel data of the pixel in the third region. According to the image display device 1 according to the present embodiment, it is possible to prevent the boundary from being recognized visually at the position where the resolution of the display screen changes, using the display panel having the uniform resolution.

The image data conversion unit 10 obtains, with respect to the pixel 26 included in the display panel based on the distance, a characterizing value (number Y of lines) relating to the number of pieces of calculation target pixel data and having the decimal part, and performs the calculation in accordance with the characterizing value. It is possible to change the calculation precisely in accordance with the distance and prevent the second image data from changing greatly at the position where the resolution of the display screen changes, by using the characterizing value having the decimal part.

The function (function F11 and the like) which characterizes the average calculation of the image data conversion unit 10 obtains the characterizing value based on the distance from a center of the display panel (distance X form screen center). It is preferable that the function be continuous within the range of values (range of 0≤X≤1) that the distance can take. With this, it is possible to prevent the second image data from changing discontinuously at an unnecessary position. It is preferable that the function change smoothly within the range of values that the distance can take. With this, it is possible to appropriately change the calculation in accordance with the distance and prevent the second image data from changing greatly at the position where the resolution of the display screen changes. It is preferable that the value of the function be larger than 1 with respect to a part of the pixels 26 in the first region. With this, the pixel data written to one pixel can be obtained considering at least the pixel data of adjacent pixels. It is preferable that the value of the function be equal to or larger than 2 with respect to the pixel 26 in the second region. With this, the pixel data written to two pixels can be obtained considering at least the pixel data of the adjacent pixels.

When the integer part of the characterizing value is Ya, the image data conversion unit 10 performs the calculation on the pixel data of the Ya piece(s) of pixel(s) 26 aligned in the first direction and the pixel data of first and second pixels adjacent to the Ya piece(s) of pixel(s) in the first direction. With this, the calculation can be performed on the number of piece(s) of the pixel data, the number indicated by the characterizing value. When the decimal part of the characterizing value is Yb, the image data conversion unit 10 performs the calculation of adding the pixel data of the Ya piece(s) of pixel(s) 26, a product of the pixel data of the first pixel and (Yb/2), and a product of the pixel data of the second pixel and (Yb/2), and dividing an obtained sum by the characterizing value. With this, the calculation in accordance with the characterizing value having the decimal part can be performed.

The display panel has the second region (left-side portion of boundary line 31), the first region (portion interposed between boundary lines 31, 32), and the second region (right-side portion of boundary line 32) aligned in order in the horizontal direction, and the image data conversion unit 10 performs the calculation on the pixel data of the pixels 26 aligned in the horizontal direction. With this, it is possible to prevent the boundary from being recognized visually at the position where the resolution of the display screen changes, when the resolution of the display screen changes at two points in the horizontal direction.

Second Embodiment

Image display devices according to second to seventh embodiments have a same configuration as the image display device 1 according to the first embodiment (refer to FIG. 1). In the second to seventh embodiments, differences from the first embodiment will be described. In the liquid crystal panel 24 of the image display device according to the second embodiment, the number of the pixel(s) 26 to which one piece of the pixel data is written changes in three steps in the horizontal direction.

Figure 6:
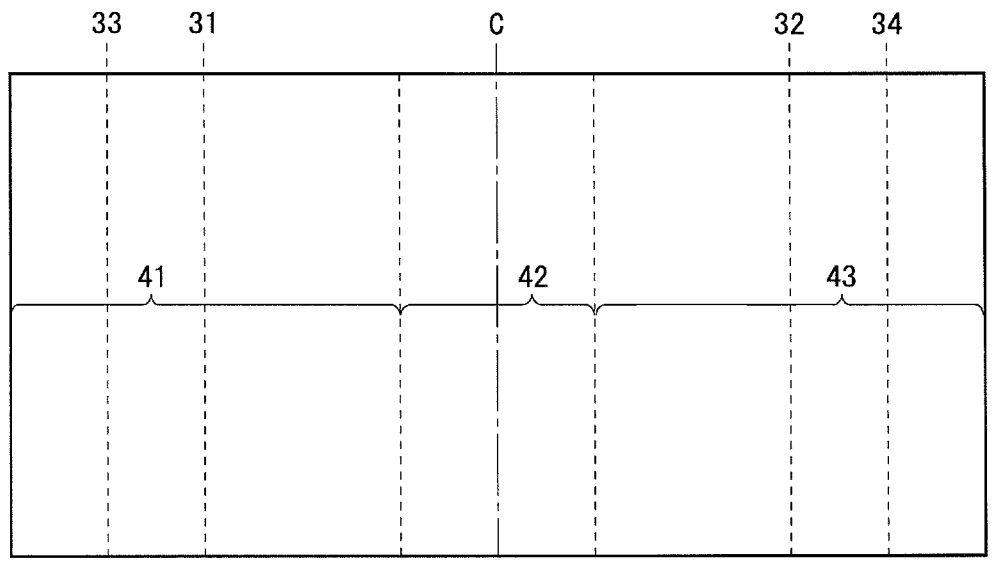
FIG. 6 is a diagram showing a region division of a liquid crystal panel in an image display device according to a second embodiment.

FIG. 6 is a diagram showing a region division of the liquid crystal panel 24 in the image display device according to the present embodiment. In addition to the boundary lines 31, 32, the liquid crystal panel 24 has a boundary line 33 at a position further apart leftward from the screen center C than the boundary line 31, and has a boundary line 34 at a position further apart rightward from the screen center C than the boundary line 32. The boundary lines 33, 34 are set at positions where the distance X from the screen center is 0.8. In the present embodiment, a portion interposed between the boundary lines 31, 32 is a one-to-one region, a portion interposed between the boundary lines 31, 33 and a portion interposed between the boundary lines 32, 34 are one-to-two regions, and a left-side portion of the boundary line 33 and a right-side portion of the boundary line 34 are one-to-three regions.

The liquid crystal panel 24 is configured so that one piece of the pixel data is written to one pixel 26 in the one-to-one region, one piece of the pixel data is written to two pixels 26 adjacent in the horizontal direction in the one-to-two region, and one piece of the pixel data is written to three pixels 26 adjacent in the horizontal direction in the one-to-three region. In the one-to-three region, every three data lines are connected to a same external terminal.

The image data conversion unit 10 performs the same processing as the first embodiment, on the pixel data of the pixel P included in the image data D1. However, the image data conversion unit 10 according to the present embodiment obtains the number Y of lines based on the distance X from the screen center, for example, using any of functions shown below.

Figure 7A:
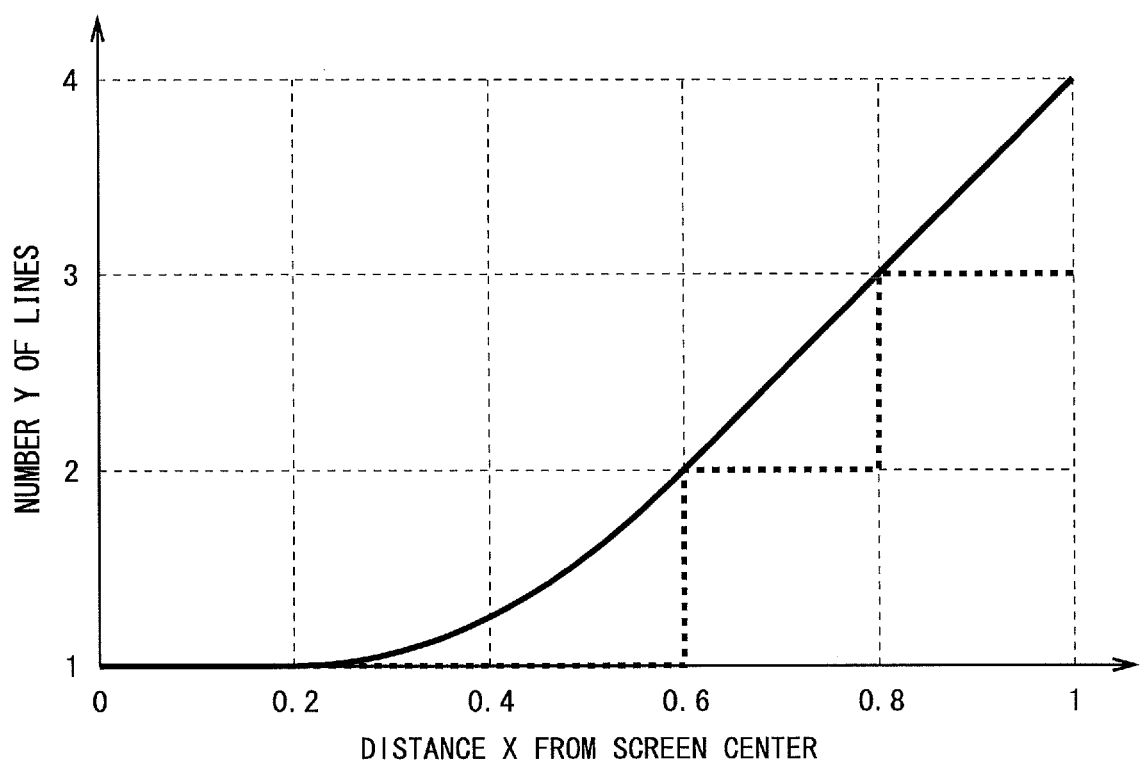
FIG. 7A is a diagram showing a relationship (first example) between a distance from a screen center and a number of lines in the image display device according to the second embodiment.

The image data conversion unit 10 may obtain the number Y of lines based on the distance X from the screen center Using a following function F21 (first example). In this case, the number Y of lines chances in accordance with the distance X from the screen center as shown in FIG. 7A. The center region 42 is a region in which the distance X from the screen center is not larger than 0.2.

$Y=1$ (when $X≤0.2$)

$Y=6.25(X-0.2)^2+1$ (when $0.2<X≤0.6$)

Figure 7B:
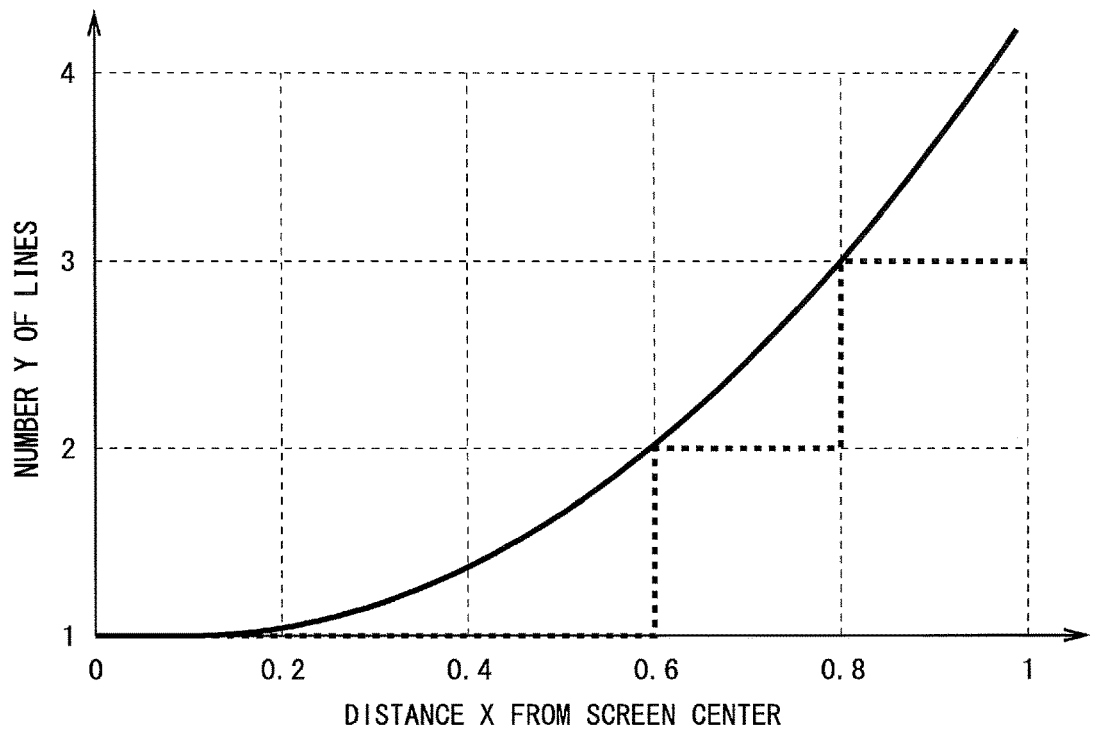
FIG. 7B is a diagram showing a relationship (second example) between the distance from the screen center and the number of lines in the image display device according to the second embodiment.

$Y=5X-1$ (when $X>0.6$)     function F21:

The image data conversion unit 10 may obtain the number Y of lines based on the distance X from the screen center using a following function F22 (second example). In this case, the number Y of lines changes in accordance with the distance X from the screen center as shown in FIG. 7B. The center region 42 is a region in which the distance X from the screen center is not larger than 0.1. Note that although a graph of the function F22 passes through a point (0.8, 3), the graph does not pass through a point (0.6, 2).

$Y=1$ (when $X≤0.1$)

Figure 7C:
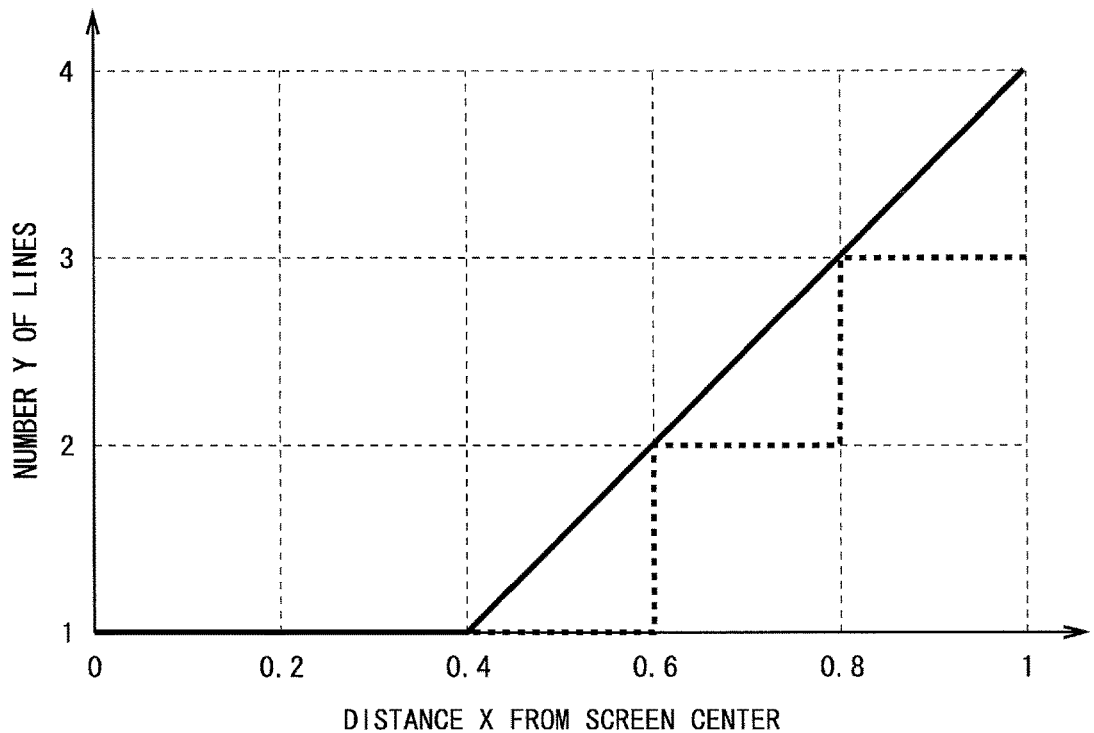
FIG. 7C is a diagram showing a relationship (third example) between the distance from the screen center and the number of lines in the image display device according to the second embodiment.

$Y=200/49×(X-0.1)^2+1$ (when $X>0.1$)     function F22:

The image data conversion unit 10 may obtain the number Y of lines based on the distance X from the screen center using a following function F23 (third example). In this case, the number Y of lines changes in accordance with the distance X from the screen center as shown in FIG. 7C. The center region 42 is a region in which the distance X from the screen center is not larger than 0.4.

$Y=1$ (when $X≤0.4$)

Figure 7D:
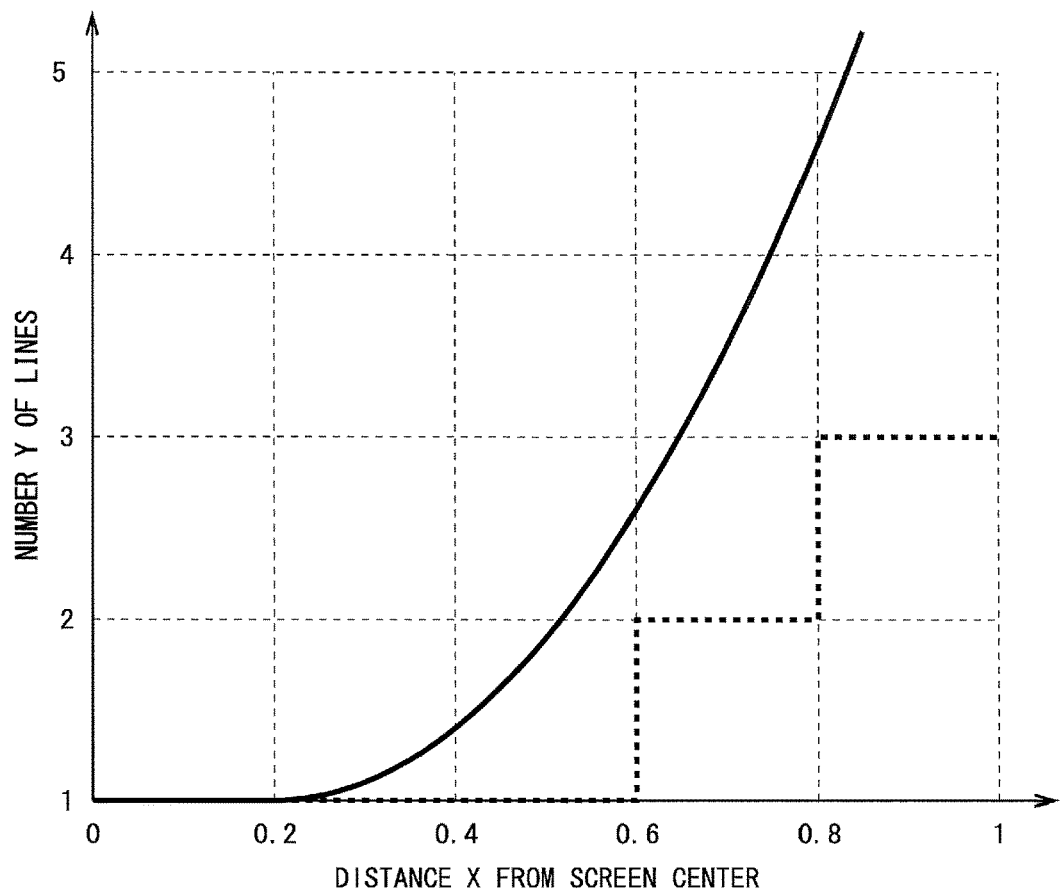
FIG. 7D is a diagram showing a relationship (fourth example) between the distance from the screen center and the number of lines in the image display device according to the second embodiment.

$Y=5X-1$ (when $X>0.4$)     function F23:

The image data conversion unit 10 may obtain the number Y of lines based on the distance X from the screen center using a following function F24 (fourth example). In this case, the number Y of lines changes in accordance with the distance X from the screen center as shown in FIG. 7D. The center region 42 is a region in which the distance X from the screen center is not larger than 0.2.

$$Y=1 \text{ (when } X \leq 0.2)$$

$$Y=10(X-0.2)^2+1 \text{ (when } X>0.2) \qquad \text{function F24:}$$

Figure 7E:
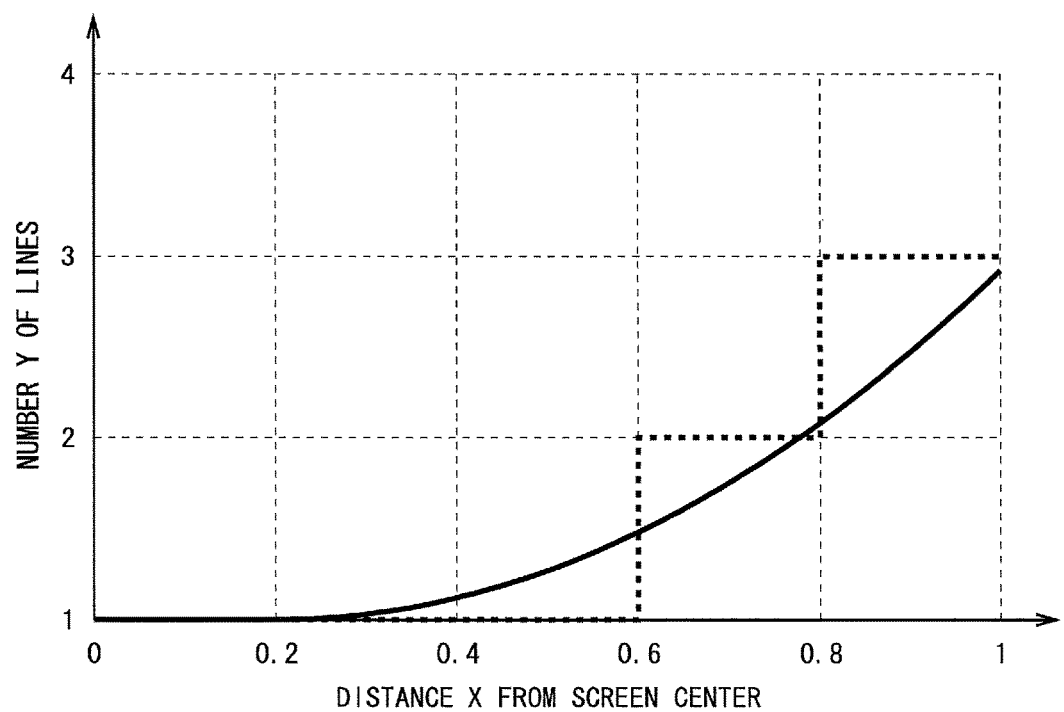
FIG. 7E is a diagram showing a relationship (fifth example) between the distance from the screen center and the number of lines in the image display device according to the second embodiment.

The image data conversion unit 10 may obtain the number Y of lines based on the distance X from the screen center using a following function F25 (fifth example). In this case, the number Y of lines changes in accordance with the distance X from the screen center as shown in FIG. 7E. The center region 42 is a region in which the distance X from the screen center is not larger than 0.2.

$$Y=1 \text{ (when } X \leq 0.2)$$

$$Y=3(X-0.2)^2+1 \text{ (when } X>0.2) \qquad \text{function F25:}$$

The functions F21 to F25 are continuous within the range of values ($0 \leq X \leq 1$) that the distance X from the screen center can take. The values of the functions F21, F24, and F25 are larger than 1 with respect to a part of the pixels in the one-to-one region (pixel satisfying $0.2<X \leq 0.6$). The value of the function F22 is larger than 1 with respect to a part of the pixels in the one-to-one region (pixel satisfying $0.1<X \leq 0.6$). The value of the function F23 is larger than 1 with respect to a part of the pixels in the one-to-one region (pixel satisfying $0.4<X \leq 0.6$). The values of the functions F21 to F24 are larger than 2 with respect to the pixel in the one-to-two region (pixel satisfying $0.6<X \leq 0.8$), and are larger than 3 with respect to the pixel in the one-to-three region (pixel satisfying $X>0.8$). That is, the values of the functions F21 to F24 are equal to or larger than a number of the pixels to which the same pixel data as that written to the pixel is written, with respect to the pixel in the one-to-two region and the one-to-three region. The functions F21, F22, F24, and F25 change smoothly within the range of values that the distance X from the screen center can take. The function F23 does not change smoothly at X=0.4. However, by using the function F23, the number Y of lines can be obtained easily based on the distance X from the screen center.

In the one-to-one region (portion interposed between boundary lines 31, 32), the pixel data included in the image data D2 is written to one pixel 26 of the liquid crystal panel 24. Furthermore, $1 \leq Y<3$, is satisfied in this portion. In this case, the image data conversion unit 10 performs the average calculation in accordance with the equations (1) and (2).

In the one-to-two region (potion interposed between boundary lines 31, 33 and portion interposed between boundary lines 32, 34), the pixel data included in the image data D2 is written to two pixels 26 adjacent in the horizontal direction of the liquid crystal panel 24. Furthermore, $1<Y<5$ is satisfied in this region. When $1<Y \leq 2$, the image data conversion unit 10 performs the average calculation in accordance with a following equation (6). When $2<Y \leq 4$, the image data conversion unit 10 performs the average calculation in accordance with the equations (3) and (4). When $4<Y<5$, the image data convers on unit 10 performs the average calculation in accordance with following equations (7) and (8).

$$Q=(P_{TL}+P_{TR})/2 \qquad (6)$$

$$k=(Y-4)/2 \qquad (7)$$

$$Q=(k \times P_{L2}+P_L+P_{TL}+P_{TR}+P_R+k \times P_{R2})/Y \qquad (8)$$

Here, in the equation (8), $P_{L2}$ is the pixel data of a second left pixel of the left target pixel, and $P_{R2}$ is the pixel data of a second right pixel of the right target pixel.

In the one-to-three region (left-side portion of boundary line 33 and right-side portion of boundary line 34), the pixel data included in the image data D2 is written to three pixels 26 adjacent in the horizontal direction (hereinafter referred to as a left target pixel, a center target pixel, and a right target pixel in order from left to right) of the liquid crystal panel 24. Furthermore, $2<Y<8$ is satisfied in this region. When $2<Y \leq 3$, the image data conversion unit 10 performs the average calculation in accordance with following equations (9) and (10). When $3<Y \leq 5$, the image data conversion unit 10 performs the average calculation in accordance with following equations (11) and (12). When $5<Y \leq 7$, the image data conversion unit 10 performs the average calculation in accordance with following equations (13) and (14). When $7<Y<8$, the image data conversion unit 10 performs the average calculation in accordance with following equations (15) and (16).

$$k=(Y-1)/2 \qquad (9)$$

$$Q=(kP_{TL}+P_{TC}+kP_{TR})/Y \qquad (10)$$

$$k=(Y-3)/2 \qquad (11)$$

$$Q=(kP_L+P_{TL}+P_{TC}+P_{TR}+kP_R)/Y \qquad (12)$$

$$k=(Y-5)/2 \qquad (13)$$

$$Q=(kP_{L2}+P_L+P_{TL}+P_{TC}+P_{TR}+P_R+kP_{R2})/Y \qquad (14)$$

$$k=(Y-7)/2 \qquad (15)$$

$$C=(kP_{L3}+P_{L2}+P_L+P_{TL}+P_{TC}+P_{TR}+P_R+P_{R2}+kP_{R3})/Y \qquad (16)$$

Here, in the above equations, $P_{TC}$ is the pixel data of the center target pixel, $P_{L3}$ is the pixel data of a third left pixel of the left target pixel, and $P_{R3}$ is the pixel data of a third right pixel of the right target pixel.

According to the image display device according to the present embodiment, when the one-to-one region, the one-to-two region, and the one-to-three region are provided to a display panel having the uniform resolution, and the resolution of the display screen is made to change in three steps in the horizontal direction, it is possible to prevent a boundary from being recognized visually at the position where the resolution of the display screen chances.

Third Embodiment

The liquid crystal panel 24 of an image display device according to a third embodiment has two screen centers. For example, in an HMD using a liquid crystal panel, two lens are placed on a liquid crystal panel in order to display a three-dimensional image. In this case, the liquid crystal panel has center of a left-eye display screen and a center of a right-eye display screen.

FIG. 8 is a diagram showing a region division of the liquid crystal panel 24 in the liquid crystal display device according to the present embodiment. In the following, it is assumed that a size in the horizontal direction of the liquid crystal panel 24 is 4Lw, a center position of a left half of the liquid crystal panel 24 in the horizontal direction is referred to as a screen center C1, and a center position of a right half of the liquid crystal panel 24 in the horizontal direction is referred to as a screen center C2. When a position S in the liquid crystal panel 24 is apart from a left end of the liquid crystal panel 24 by a distance Ls, (Ls/Lw) is referred to as "distance from left end of screen" of the position S, and is denoted by Z. A range of values that the distance Z from the left end of the screen can take is 0≤Z≤4.

The liquid crystal panel 24 has a boundary line 51 at a position apart leftward from the screen center C1 by a predetermined distance, has a boundary line 52 at a position apart rightward from the screen center C1 by the same distance, has a boundary line 53 at a position apart leftward from the screen center C2 by the same distance, and has a boundary line 54 at a position apart rightward from the screen center C2 by the same distance. The boundary lines 51 to 54 are set at positions where the distances Z from the left end of the screen are 0.4, 1.6, 2.4, and 3.6, respectively. In the present embodiment, a portion interposed between the boundary lines 51, 52 and a portion interposed between the boundary lines 53, 54 are one-to-one regions, a left-side portion of the boundary lines 51, a portion interposed between the boundary lines 52, 53, and a right-side portion of the boundary line 54 are one-to-two regions.

Apart from this, the liquid crystal panel 24 has a left-side region 61, a first center region 62, a middle region 63, a second center region 64, and a right-side region 65. The pixel data on which the average calculation is not performed is written to the pixel 26 in the first center region 62 and the second center region 64. The pixel data after the average calculation is written to the pixel 26 in the left-side region 61, the middle region 63, and the right-side region 65.

The image data conversion unit 10 performs the same processing as the first embodiment, on the pixel data of the pixel P included in the image data D1. However, the image data conversion unit 10 according to the present embodiment obtains the number Y of lines based on the distance Z from the left end of the screen, for example, using any of functions shown below.

Figure 9A:
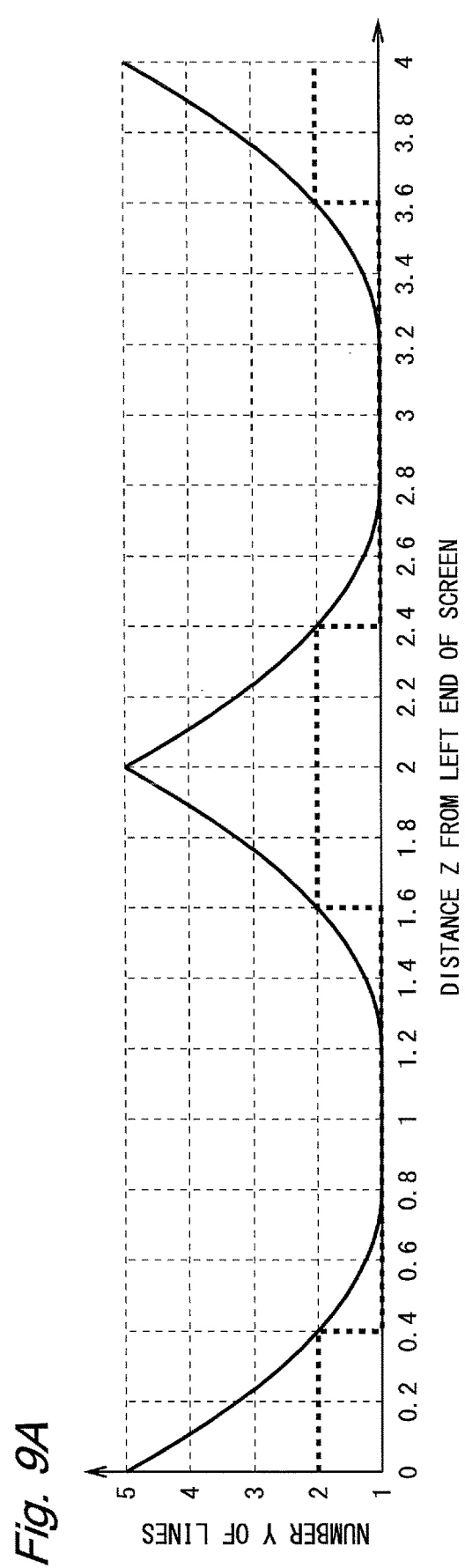
FIG. 9A is a diagram showing a relationship (first example) between a distance from a left end of a screen and a number of lines in the image display device according to the third embodiment.

The image data conversion unit 10 may obtain the number Y of lines based on the distance Z from the left end of the screen using a following function F31 (first example). In this case, the number Y of lines changes in accordance with the distance Z from the left end of the screen as shown in FIG. 9A. The first center region 62 is a region in which the distance Z from the left end of the screen is not smaller than 0.8 and not larger than 1.2. The second center region 64 is a region in which the distance from the left end of the screen is not smaller than 2.8 and not larger than 3.2.

$Y=6.25(Z-0.8)^2+1$ (when Z≤0.8)

$Y=1$ (when 0.8<Z≤1.2)

$Y=6.25(Z-1.2)^2+1$ (when 1.2<Z≤2)

$Y=6.25(Z-2.8)^2+1$ (when 2<Z≤2.8)

$Y=1$ (when 2.8<Z≤3.2)

Figure 9B:
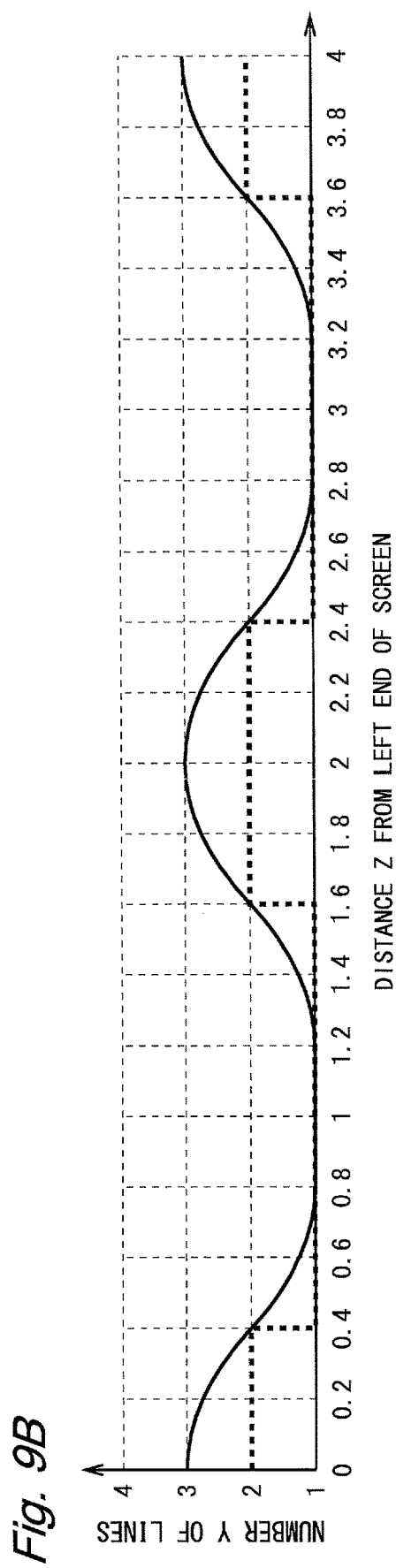
FIG. 9B is a diagram showing a relationship (second example) between the distance from the left end of the screen and the number of lines in the image display device according to the third embodiment.

$Y=6.25(Z-3.2)^2+1$ (when Z>3.2)      function F31:

The image data conversion unit 10 may obtain the number of lines based on the distance Z from the left end of the screen using a following function F32 (second example). In this case, the number Y of lines changes in accordance with the distance Z from the left end of the screen as shown in FIG. 9B. The first center region 62 is a region in which the distance Z from the left end of the screen is not smaller than 0.8 and not larger than 1.2. The second center region 64 is a region in which the distance from the left end of the screen is not smaller than 2.8 and not larger than 3.2.

$Y=-6.25Z^2+3$ (when Z≤0.4)

$Y=6.25(Z-0.8)^2+1$ (when 0.4<Z≤0.8)

$Y=1$ (when 0.8<Z≤1.2)

$Y=6.25(Z-1.2)^2+1$ (when 1.2<Z≤1.6)

$Y=-6.25(Z-2)^2+3$ (when 1.6<Z≤2.4)

$Y=6.25(Z-2.8)^2+1$ (when 2.4<Z≤2.8)

$Y=1$ (when 2.8<Z≤3.2)

$Y=6.25(Z-3.2)^2+1$ (when 3.2<Z≤3.6)

$Y=-6.25(Z-4)^2+3$ (when Z>3.6)       function F32:

The functions F31 and F32 are continuous within the range of values (0≤Z≤4) that the distance Z from the left end of the screen can take. The values of the functions F31 and F32 are larger than 1 with respect to a part of the pixels in the one-to-one region (pixel satisfying 0.4≤Z<0.8, 1.2<Z≤1.6, 2.4≤Z<2.8, or 3.2<Z≤3.6). The values of the functions F31 and F32 are equal to or larger than 2 (that is, are equal to or larger than a number of pixels to which the same pixel data as that written to the pixel is written) with respect to the pixel in the one-to-two region (pixel satisfying Z<0.4, 1.6<Z<2.4, or Z>3.6). The function F31 changes smoothly within the range of values that the distance Z from the left end of the screen can take.

In the one-to-one region (portion interposed between boundary lines 51, 52 and portion interposed between boundary lines 53, 54), the pixel data included in the image data D2 is written to one pixel 26 of the liquid crystal panel 24. Furthermore, 1≤Y≤2 is satisfied in this region. In this case, the image data conversion unit 10 performs the average calculation in accordance with the equations (1) and (2).

In the one-to-two region (left-side portion of boundary line 51, portion interposed between boundary lines 52, 53, and right-side portion of boundary line 54), the pixel data included in the image data D2 is written to two pixels 26 adjacent in the horizontal direction of the liquid crystal panel 24. Furthermore, 2<Y≤5 is satisfied in this region. When 2<Y≤3, the image data conversion unit 10 performs the average calculation in accordance with the equations (9) and (10). When 3<Y≤5, the image data conversion unit 10 performs the average calculation in accordance with the equations (11) and (12).

In the image display device according to the present embodiment, the function (function F31 and the like) which characterizes the average calculation of the image data conversion unit 10 obtains a characterizing value (number Y of lines) based on a distance from one end of the display panel (distance Z from left end of screen). The display panel (liquid crystal panel 24) has the second region (left-side portion of boundary line 51), the first region (portion interposed between boundary lines 51, 52), the second region (portion interposed between boundary lines 52, 53), the first region (portion interposed between boundary lines 53, 54), and the second region (right-side portion of boundary line 54) aligned in the horizontal direction, and the image data conversion unit 10 performs the calculation on the pixel data of the pixels 26 aligned in the horizontal direction. With this, it is possible to prevent a boundary from being recognized visually at the position where the resolution of the display screen changes, when the display panel has two screen centers and the resolution of the display screen changes in two levels in the horizontal direction.

Fourth Embodiment

The liquid crystal panel 24 of an image display device according to a fourth embodiment has two screen centers. In the liquid crystal panel 24, the number of the pixel(s) 26 to which one piece of the pixel data is written changes in three steps in the horizontal direction.

Figure 10:
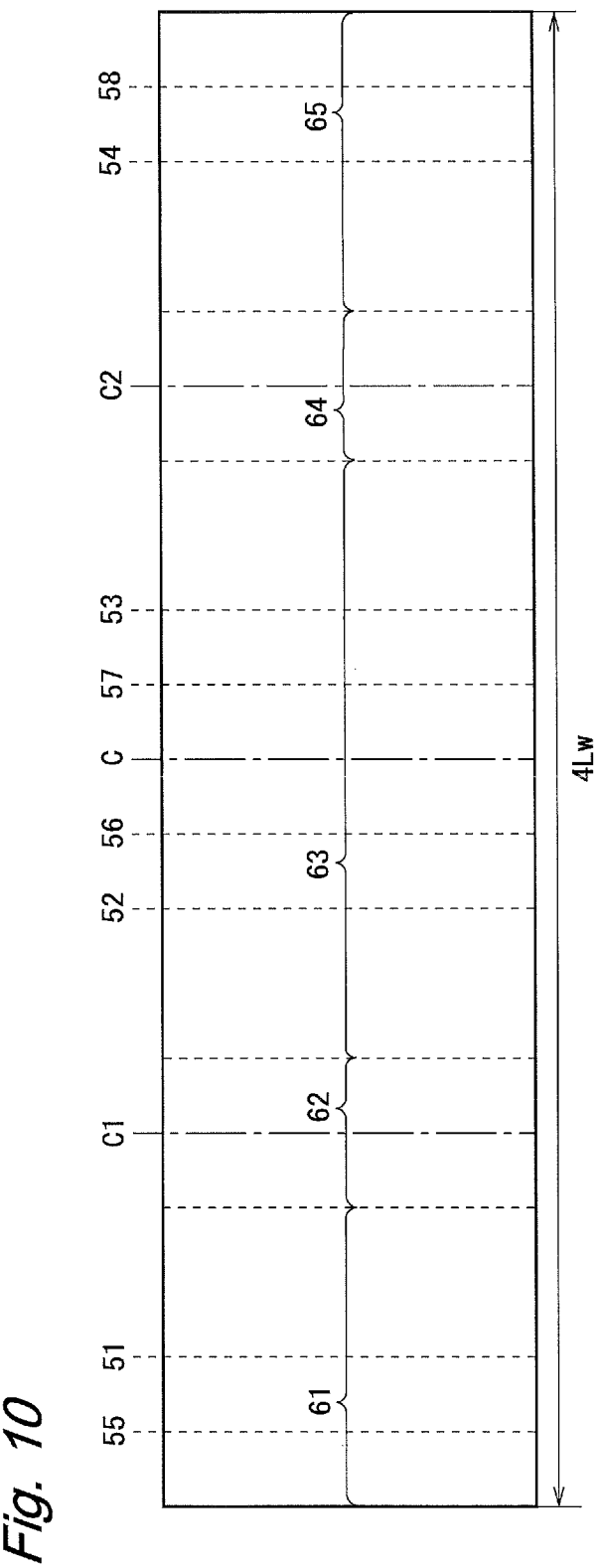
FIG. 10 is a diagram showing a region division of a liquid crystal panel in an image display device according to a fourth embodiment.

FIG. 10 is a diagram showing a region division of the liquid crystal panel 24 in the image display device according to the present embodiment. In addition to the boundary lines 51 to 54, the liquid crystal panel 24 has a boundary line 55 at a position further apart leftward from the screen center C1 than the boundary line 51, has a boundary line 56 at a position further apart rightward from the screen center C1 than the boundary line 52, has a boundary line 57 at a position further apart leftward from the screen center C2 than the boundary line 53, and has a boundary line 58 at a position further apart rightward from the screen center C2 than the boundary line 54. The boundary lines 55 to 58 are set at positions where the distances Z from the left end of the screen are 0.2, 1.8, 2.2, and 3.8, respectively.

In the present embodiment, a portion interposed between the boundary lines 51, 52 and a portion interposed between the boundary lines 53, 54 are one-to-one regions, a portion interposed between the boundary lines 51, 55, a portion interposed between the boundary lines 52, 56, a portion interposed between the boundary lines 53, 57, and a portion interposed between the boundary lines 54, 58 are one-to-two regions, and a left-side portion of the boundary line 55, a portion interposed between the boundary lines 56, 57, and a right-side portion of the boundary line 58 are one-to-three regions.

Figure 11:
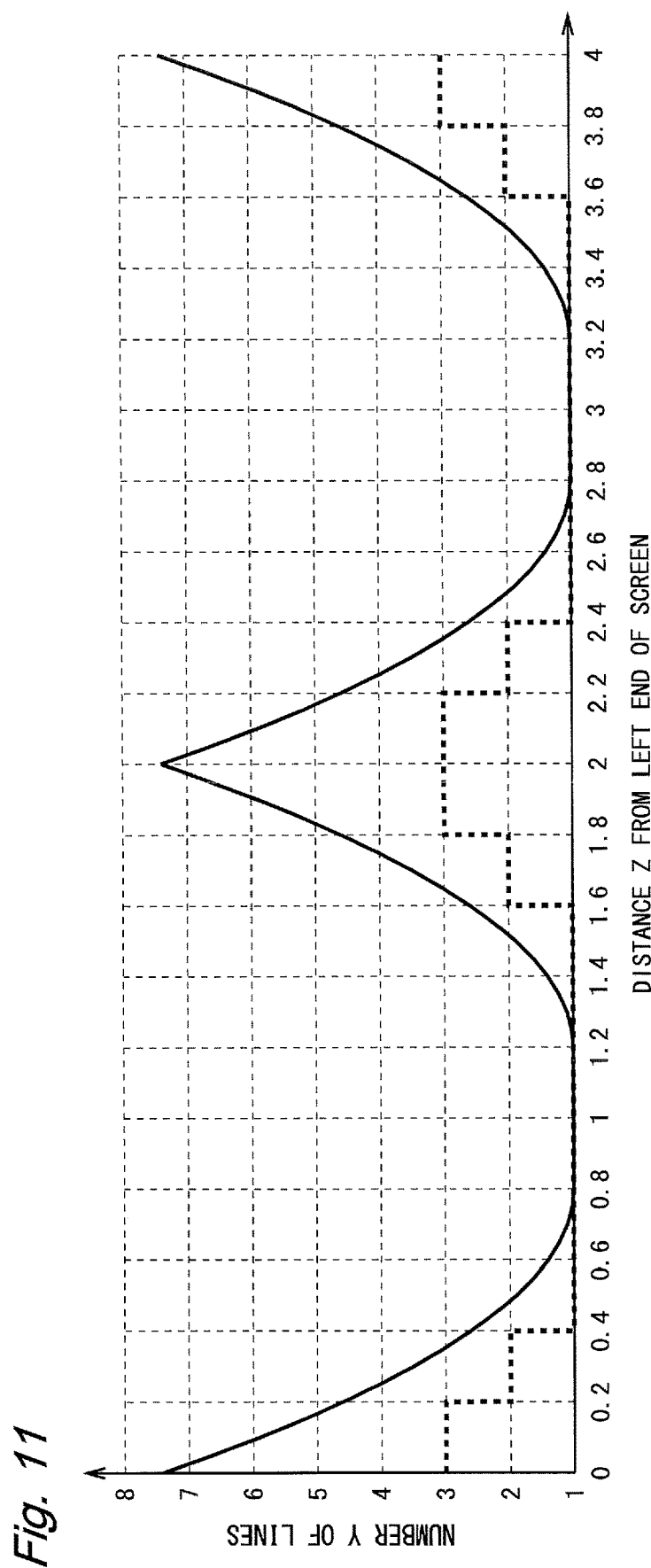
FIG. 11 is a diagram showing a relationship between a distance from a left end of a screen and a number of lines in the image display device according to the fourth embodiment.

The image data conversion unit 10 performs the same processing as the first embodiment, on the pixel data of the pixel P included in the image data D1. However, the image data conversion unit 10 according to the present embodiment obtains the number Y of lines based on the distance Z from the left end of the screen, for example, using a following function F41. In this case, the number Y of lines changes in accordance with the distance Z from the left end of the screen as shown in FIG. 11. The first center region 62 is a region in which the distance Z from the left end of the screen is not smaller than 0.8 and not larger than 1.2. The second center region 64 is a region in which the distance Z from the left end of the screen is not smaller than 2.8 and not larger than 3.2.

$Y=10(Z-0.8)^2+1$ (when $Z≤0.8$)

$Y=1$ (when $0.8<Z≤1.2$)

$Y=10(Z-1.2)^2+1$ (when $1.2<Z≤2$)

$Y=10(Z-2.8)^2+1$ (when $2<Z≤2.8$)

$Y=1$ (when $2.8<Z≤3.2$)

$Y=10(Z-3.2)^2+1$ (when $Z>3.2$)   function F41:

The function F41 is continuous within the range of values ($0≤Z≤4$) that the distance from the left end of the screen can take. The value of the function F41 is larger than 1 with respect to a part of the pixels in the one-to-one region (pixel satisfying $0.4≤Z<0.8$, $1.2<Z≤1.6$, $2.4≤Z<2.8$, or $3.2<Z≤3.6$). The value of the function F41 is equal to or larger than 2 with respect to the pixel in the one-to-two region (pixel satisfying $0.2≤Z<0.4$, $1.6<Z≤1.8$, $2.2≤Z<2.4$, or $3.6<Z≤3.8$), and is equal to or larger than 3 with respect to the pixel in the one-to-three region (pixel satisfying $Z<0.2$, $1.8<Z<2.2$, or $Z>3.8$). That is, the value of the function F41 is larger than a number of pixels to which the same pixel data as that written to the pixel is written, with respect to the pixel the one-to-two region and the one-to-three region.

According to the image display device according to the present embodiment, when the one-to-one region, the one-to-two region, and the one-to-three region are provided to the display panel having two center positions and the uniform resolution, and the resolution of the display screen is made to change in three steps in the horizontal direction, it is possible to prevent a boundary from being recognized visually at the position where the resolution of the display screen changes.

Fifth Embodiment

In an image display device according to a fifth embodiment, the function for obtaining the number Y of lines is different in accordance with a color of the pixel 26. The liquid crystal panel 24 includes a red pixel for displaying red, a green pixel for displaying green, and a blue pixel for displaying blue, and is divided into the regions shown in FIG. 2.

The image data conversion unit 10 obtains the number Y of lines with respect to the red pixel and the green pixel in accordance with the distance X from the screen center, for example, using the above-described function F11. The image data conversion unit 10 obtains the number Y of lines with respect to the blue pixel based on the distance X from the screen center, for example, using any of functions shown below. In this manner, the function for the blue pixel is different from the function for the red pixel and the function for the green pixel.

Figure 12A:
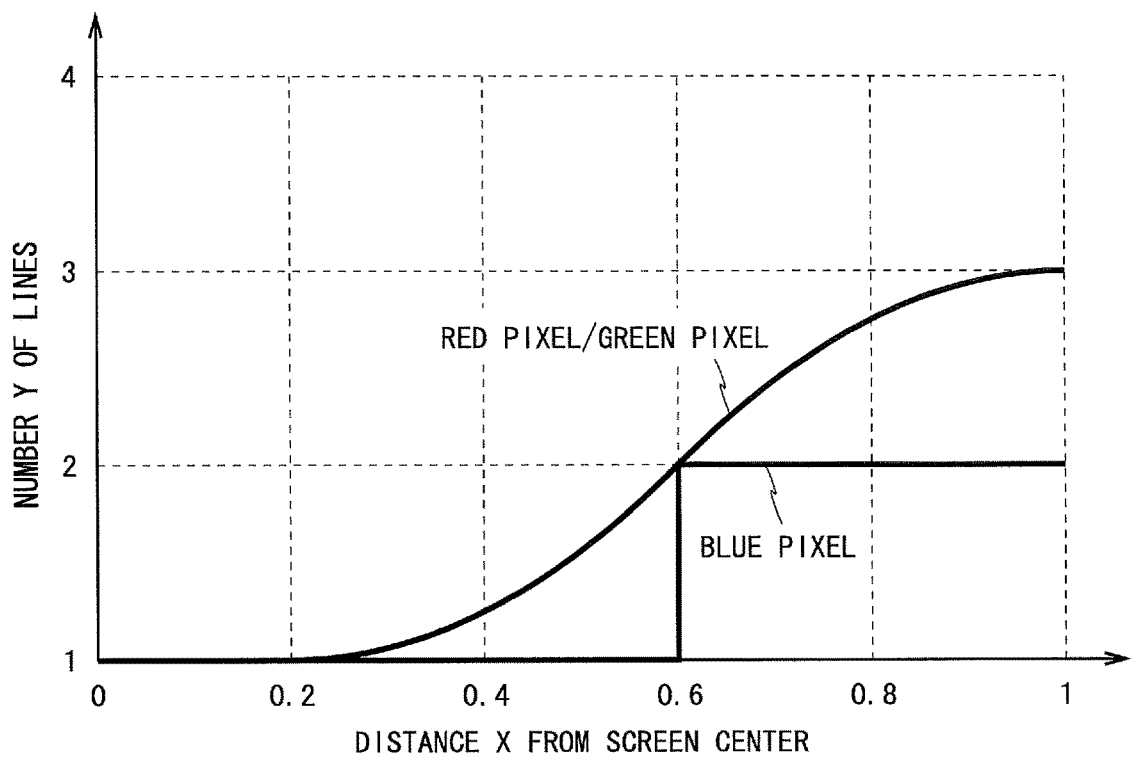
FIG. 12A is a diagram showing a relationship (first example) between a distance from a screen center and a number of lines in an image display device according to a fifth embodiment.

The image data conversion unit 10 may obtain the number Y of lines based on the distance X from the screen center using a following function F51 (first example). In this case, the number Y of lines changes in accordance with the distance X from the screen center as shown in FIG. 12A.

$Y=1$ (when $X≤0.6$)

Figure 12B:
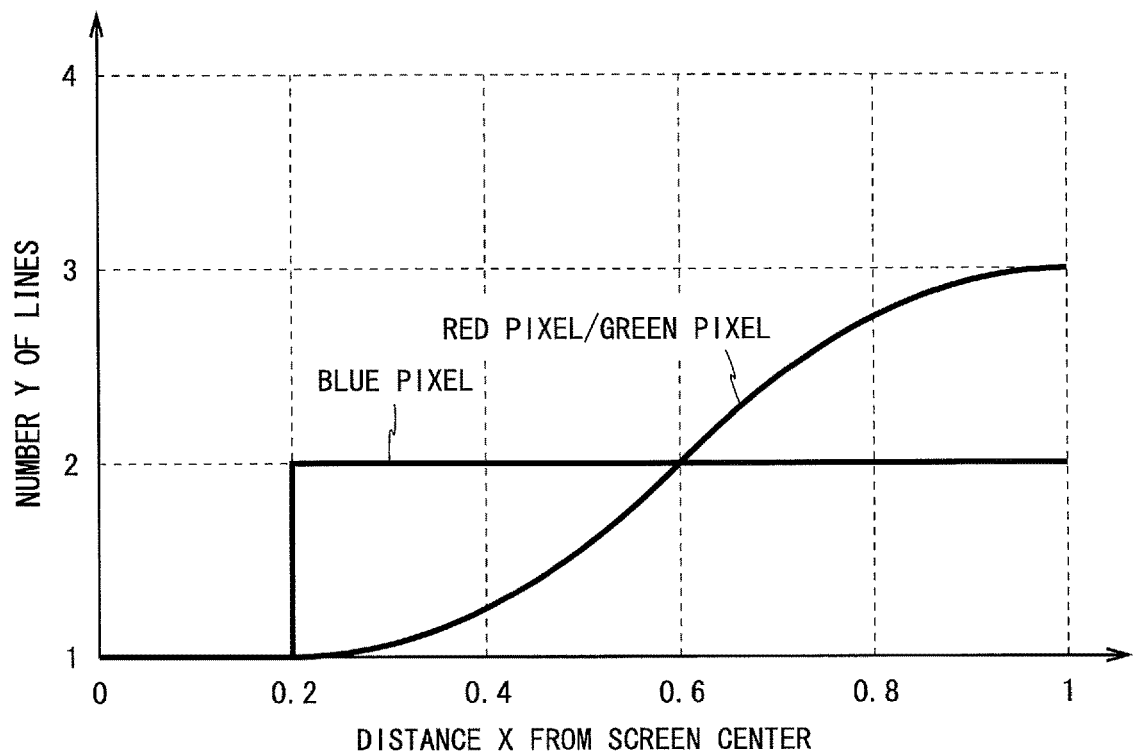
FIG. 12B is a diagram showing a relationship (second example) between the distance from the screen center and the number of lines in the image display device according to the fifth embodiment.

$Y=2$ (when $X>0.6$)   function F51:

The image data conversion unit 10 may obtain the number Y of lines based on the distance X from the screen center using a following function F52 (second example). In this case, the number Y of lines changes in accordance with the distance X from the screen center as shown in FIG. 12B.

$Y=1$ (when $X≤0.2$)

$Y=2$ (when $X≥0.2$)   function F52:

In general, brightness of the blue pixel is lower than brightness of the red pixel and the green pixel. Thus, even when a resolution of a blue image configured by the blue pixels is reduced, it is difficult for the user to recognize a change of a display image. Therefore, even if the function for the blue pixel does not change smoothly, the user hardly recognizes the change of the display image. By using the function which changes in a stepwise manner, such as the functions F51 and F52, as the function for the blue pixel, it is possible to obtain the number Y of lines for the blue pixel easily and perform the average calculation easily.

In the above-described example, it is assumed that the function for the red pixel and the function for the green pixel are same, and the function for the blue pixel is different from the function for the red pixel and the function for the green pixel. Instead of this, the function for the green pixel and the function for the blue pixel are same, and the function for the red pixel is different from the function for the green pixel and the function for the blue pixel. Furthermore, all of the function for the red pixel, the function for the green pixel, and the function for the blue pixel may be different.

In the image display device according to the present embodiment, the function which characterizes the average calculation of the image data conversion unit 10 is different in accordance with the color of the pixel 26. With this, it is possible to use a suitable function in accordance with characteristics of the color. The display panel (liquid crystal panel 24) has the red pixel, the green pixel, and the blue pixel, and the function for the blue pixel is different from the function for the red pixel and the function for the green pixel. With this, it is possible to obtain a characterizing value (number Y of lines) for the blue pixel easily and perform the average calculation easily, with the display image almost unchanged.

Sixth Embodiment

In the liquid crystal panel 24 according to a sixth embodiment, the number of the pixel(s) 26 to which one piece of the pixel data is written changes in the horizontal direction and the vertical direction.

Figure 13:
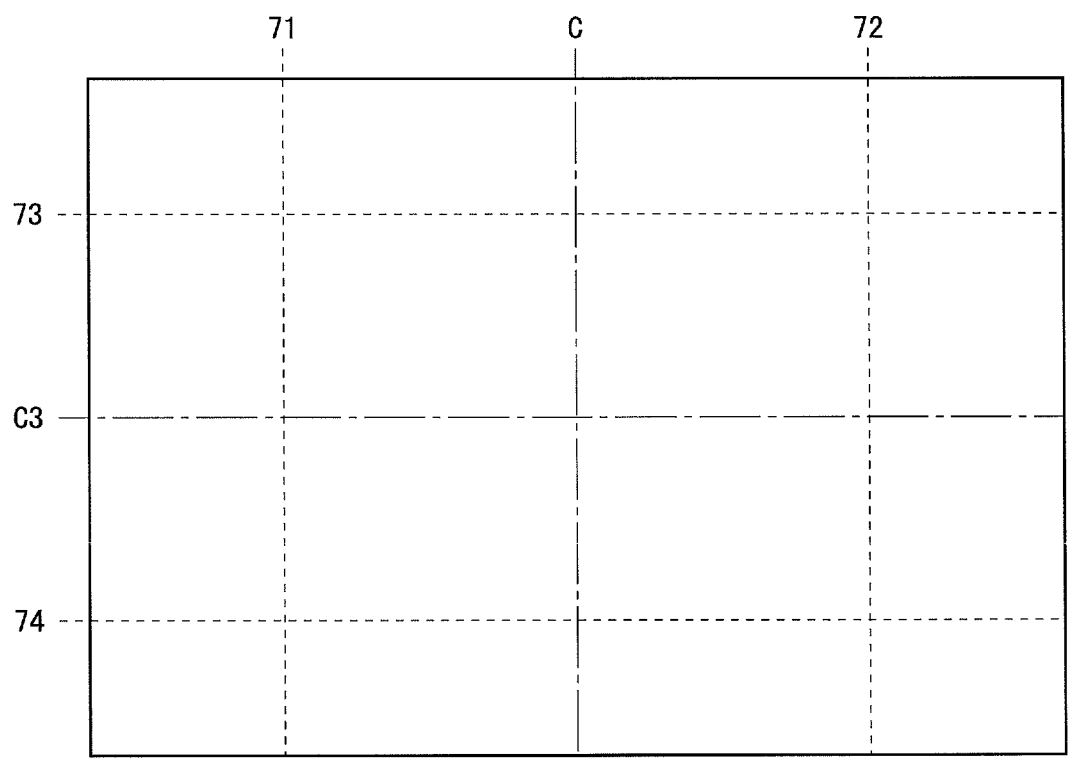
FIG. 13 is a diagram showing a region division of a liquid crystal panel in an image display device according to a sixth embodiment.

FIG. 13 is a diagram showing a region division of the liquid crystal panel 24 in the image display device according to the present embodiment. Hereinafter, a center position in the vertical direction of the liquid crystal panel 24 is referred to as a screen center C3. The liquid crystal panel 24 has a boundary line 71 at a position apart leftward from the screen center C by a predetermined distance, has a boundary line 72 at a position apart rightward from the screen center C by the same distance, has a boundary line 73 at a position apart upward from the screen center C3 by a predetermine distance, and has a boundary line 74 at a position apart downward from the screen center C3 by the same distance. In the present embodiment, a portion surrounded by the boundary lines 71 to 74 is a one-to-one region, and a remaining portion is a one-to-multiple region.

The liquid crystal panel 24 is configured so that one piece of the pixel data is written to one pixel 26 in the one-to-one region, and in the one-to-multiple region, one piece of the pixel data is written to two pixels 26 adjacent in the horizontal direction, two pixels 26 adjacent in the vertical direction, or four pixels 26 adjacent in the horizontal direction and the vertical direction.

The image data conversion unit 10 performs following processing on the pixel data of the pixel P included in the image data D1. First, the image data conversion unit 10 takes a center position in the horizontal direction of the liquid crystal panel 24 as the screen center, and obtains a distance X1 of the pixel P from the screen center at this time. Next, the image data conversion unit 10 obtains a number Y1 of lines in the horizontal direction based on the distance from the screen center. Next, the image data conversion unit 10 performs the average calculation on the pixel data of the pixel P and the pixel data of the pixels 26 arranged in a same row as the pixel P, in accordance with the number Y1 of lines in the horizontal direction.

Next, the image data conversion unit 10 takes a center position in the vertical direction of the liquid crystal panel 24 as the screen center, and obtains a distance X2 of the pixel P from the screen center at this time. Next, the image data conversion unit 10 obtains a number Y2 of lines in the vertical direction based on the distance X2 from the screen center. Next, the image data conversion unit 10 performs the average calculation on the pixel data of the pixel P after the average calculation in the horizontal direction and the pixel data of the pixels 26 arranged in a same column as the pixel P after the average calculation in the horizontal direction, in accordance with the number Y2 of lines in the vertical direction.

The image data conversion unit 10 may perform the average calculation in the horizontal direction and the average calculation in the vertical direction, either one first. The image data conversion unit 10 may use a same function or may use different functions when obtaining the number Y1 of lines in the horizontal direction and when obtaining the number Y2 of lines in the vertical direction. The image data conversion unit 10 may obtain the number Y1 of lines in the horizontal direction and the number Y2 of lines in the vertical direction together based on a two-dimensional position in the liquid crystal panel 24.

In the image display device according to the present embodiment, the display panel (liquid crystal panel 24) has the first region (portion surrounded by boundary lines 71 to 74) in a center portion, and has the second region (remaining portion) in a surrounding portion, and the image data conversion unit 10 performs the average calculation on the pixel data of the pixels 26 aligned in the horizontal direction, and performs the average calculation on the pixel data of the pixels 26 aligned in the vertical direction. According to the image display device according to the present embodiment, when the resolution of the display screen changes in the horizontal direction and the vertical direction, it is possible to prevent a boundary from being recognized visually at the position where the resolution of the display screen changes.

Figure 14A:
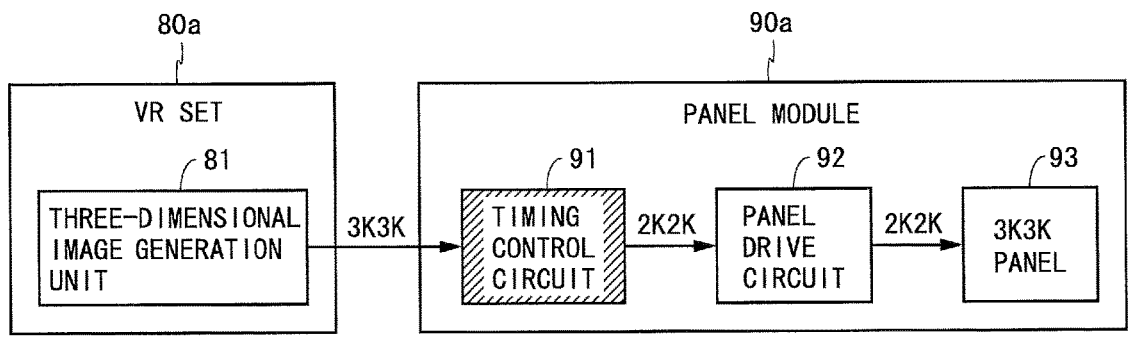
FIG. 14A is a block diagram showing a VP system (first example) including the image display device according to the sixth embodiment.
Figure 14B:
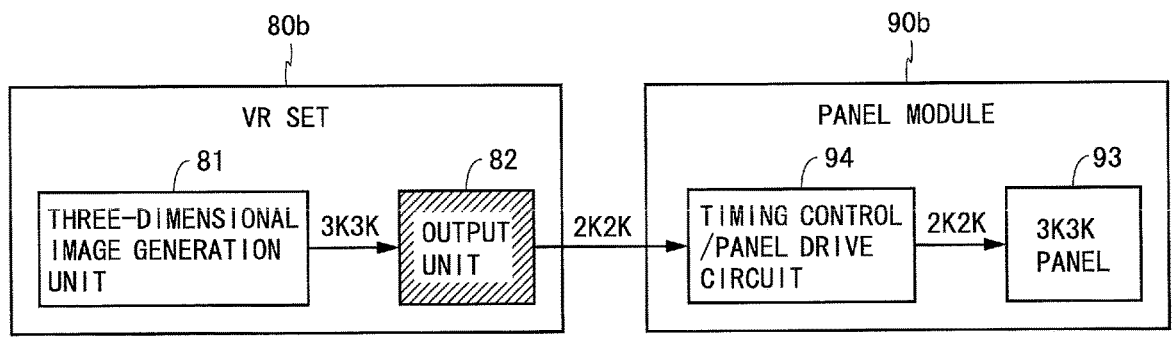
FIG. 14B is a block diagram showing a VR system (second example) including the image display device according to the sixth embodiment.
Figure 14C:
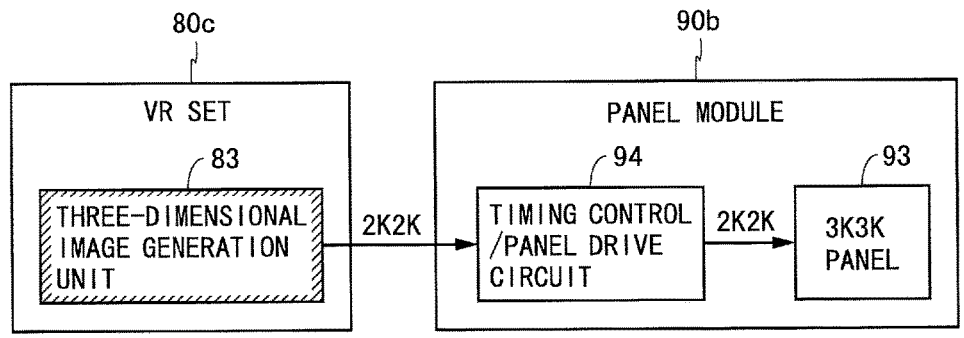
FIG. 14C is a block diagram showing a VR system (third example) including the image display device according to the sixth embodiment.
Figure 15:
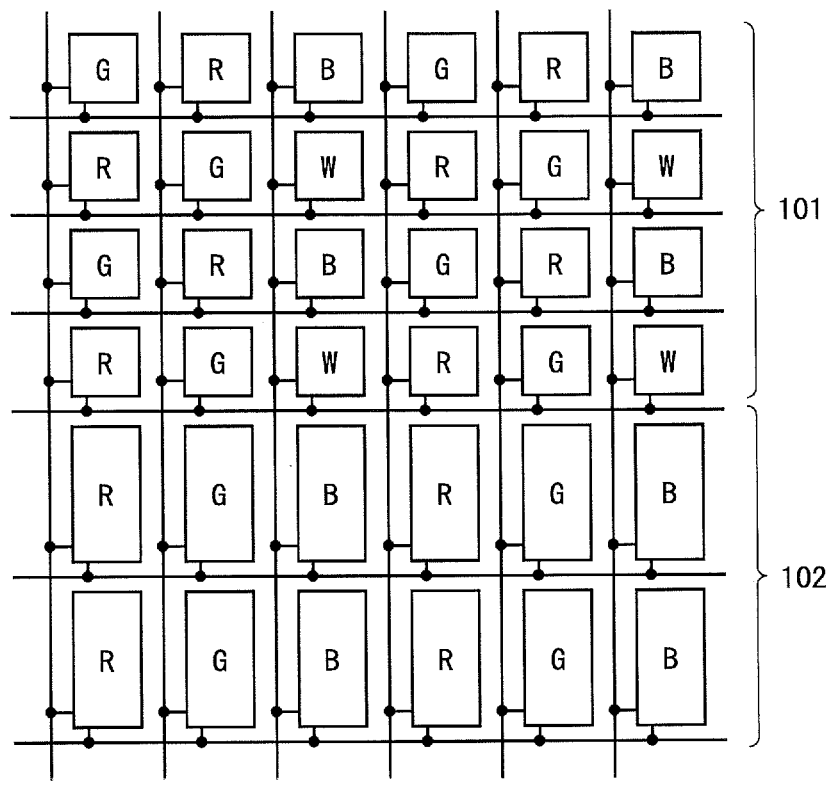
FIG. 15 is a diagram showing a conventional display panel.
Figure 16:
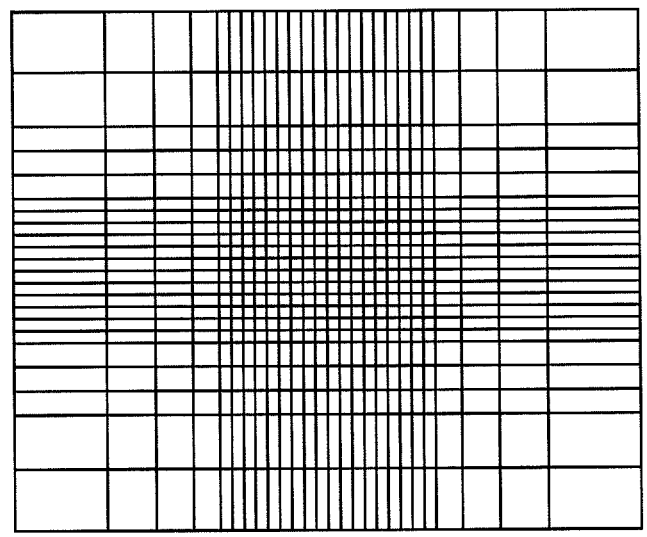
FIG. 16 is a diagram showing a conventional display panel.

In the following, as an example of a system including the image display device according to the sixth embodiment, a VR (Virtual Reality) system will be described. FIGS. 14A to 14C are block diagrams showing VR systems according to first to third examples, respectively. Here, it is assumed that the liquid crystal panel 24 includes (3K×3K) pixels 26 ((3,072×3,072) pixels), and the liquid crystal panel is referred to as "3K3K panel". It is assumed that the 3K3K panel is configured so that among 3,072 pixels arranged in the same row or the same column, one piece of the pixel data is written to each of 1,024 pixels, and a same pixel data is written to remaining 2,048 pixels so that one piece of data is written to two pixels. The number of pieces of the pixel data written no the 3K3K panel is 2K×2K (2,048×2,048).

An image data conversion unit (not shown) for performing the average calculation in the horizontal direction and the average calculation in the vertical direction on the image data including (3K×3K) pieces of pixel data is provided to the VR systems shown in FIGS. 14A to 14C. The image data conversion unit is included in hatched elements in FIGS. 14A to 14C.

The VR system according to the first example (FIG. 14A) includes a VR set 80a and a panel module 90a. The VR set 80a includes a three-dimensional image generation unit 81. The panel module 90a includes a timing control circuit 91, a panel drive circuit 92, and a 3K3K panel 93. The three-dimensional image generation unit 81 generates image data for three-dimensional display including (3K×3K) pieces of pixel data. The generated image data is transferred from the VR set 80a to the panel module 90a. The timing control circuit 91 converts the image data transferred from the VR set 80a, to image data including (2K×2K) pieces of pixel data using the image data conversion unit included therein.

The panel drive circuit 92 drives the 3K3K panel 93 based on the image data after conversion. According to the VR system according to the first example, it is possible to reduce an amount of data transmission between the panel drive circuit 92 and the 3K3K panel 93.

The VR system according to the second example (FIG. 14B) includes a VR set 80b and a panel module 90b. The VR set 80b includes the three-dimensional image generation unit 81 and an output unit 82. The panel module 90b includes a timing control/panel drive circuit 94 and the 3K3K panel 93. The three-dimensional image generation unit 81 generates image data for three-dimensional display including (3K× 3K) pieces of pixel data. The output unit 82 converts the image data generated by the three-dimensional image generation unit 81 to image data including (2K×2K) pieces of pixel data using the image data conversion unit included therein. The image data after conversion is transferred from the VR set 80b to the panel module 90b. The timing control/panel drive circuit 94 drives the 3K3K panel 93 based on the image data transferred from the VR set 80b. According to the VR system according to the second example, it is possible to reduce an amount of data transmission between the timing control/panel drive circuit 94 and the 3K3K panel 93 and an amount of data transmission between the VR set 80b and the panel module 90b.

The VR system according to the third example (FIG. 14C) includes a VR set 80c and the panel module 90b. The VR set 80c includes a three-dimensional image generation unit 83. The three-dimensional image generation unit 83 generates image data for three-dimensional display including (3K× 3K) pieces of pixel data, and converts the generated image data to image data including (2K×2K) pieces of pixel data using the image data conversion unit included therein. The image data after conversion is transferred from the VR set 80c to the panel module 90b. The timing control/panel drive circuit 94 drives the 3K3K panel 93 based on the image data transferred from the VR set 80c. According to the VR system according to the third example, it is possible no reduce an amount of data transmission between the timing control/panel drive circuit 94 and the 3K3K panel 93 and an amount of data transmission between the VR set 80c and the panel module 90b.

Seventh Embodiment

The panel drive circuit 22 of an image display device according to a seventh embodiment switches whether to write whole of the pixel data or write a part of the pixel data, depending on a position of the pixel 26. The liquid crystal panel 24 is divided into the regions as shown in FIG. 2. The pixel data on which the average calculation is not performed is written to the pixel 26 in the center region 42. In this case, the panel drive circuit 22 writes all bits of the pixel data to the pixel 26.

The pixel data after the average calculation is written to the pixel 26 in the left-side region 41 and the right-side region 43. In this case, the panel drive circuit 22 discards lower bits of the pixel data and writes upper bits of the pixel data to the pixel 26. For example, when the pixel data is 16 bit data, the panel drive circuit 22 may write upper 12 bits of the pixel data to the pixel 26, or may write upper 14 bits of the pixel data to the pixel 26.

Even if only the upper bits of the pixel data are written to the pixel 26 in the surrounding portion of the display screen, the user hardly recognizes the change of the display image. On the contrary, a load of the panel drive circuit 22 can be reduced by reducing a number of bits of the pixel data written to the pixel 26 in accordance with the position of the pixel 26.

Note that although a range in which the number of bits of the pixel data is reduced is made to match with the one-to-two region, it does not necessarily have to match the two regions. A range in which the number of bits of the pixel data is reduced may be smaller than the one-to-two region.

In general, when the display panel (liquid crystal panel 24) has a fifth region and a sixth region, it is enough that the drive circuit (panel drive circuit 22) writes the whole of the pixel data to the pixel in the fifth region and writes a part of the pixel data to the pixel in the sixth region. In the above example, the fifth region and the sixth region are same as the first region (one-to-one region) and the second region (one-to-two region), respectively.

When the image display device performs overshoot processing, an overshoot processing unit may perform processing for reducing the number of bits of the pixel data, in place of the panel drive circuit 22. For this purpose, the overshoot processing unit may have another conversion table for obtaining only upper bits of the pixel data in addition to a normal conversion table for the overshoot processing. Alternatively, the overshoot processing unit may have the normal conversion table and a lower bit discard unit for discarding lower bits of the pixel data after conversion.

In general, brightness of the blue pixel is lower than brightness of the red pixel, and brightness of the red pixel is lower than brightness of the green pixel. Thus, the panel drive circuit 22 may switch a manner of reducing the number of bits of the pixel data in accordance with a color of the pixel 26. For example, the panel drive circuit 22 may write the whole of 16 bit pixel data to the green pixel, may write upper 14 bits of the pixel data to the red pixel, and may write upper 12 bits of the pixel data to the blue pixel.

According to the image display device according to the present embodiment, the load of the drive circuit (panel drive circuit 22) can be reduced by reducing the number of bits of the pixel data written to the pixel 26 in accordance with the position of the pixel 26.

Note that image display devices according to a variety of variants can be configured by arbitrarily combining features of the above-described image display devices according to each embodiments so long as it does not contradict their nature. Furthermore, although the liquid crystal display devices are described as the image display devices according to the embodiments, it is possible to configure the image display device other than the liquid crystal display device, such as an organic EL display, by a similar method.

Each of the image data conversion unit, the three-dimensional image generation unit, the output unit, the overshoot processing unit, and the lower bit discard unit described above is configured by a circuit that operates as the unit. For example, the circuit may be a dedicated circuit for operating as the unit, or may be a combination of a CPU or DSP, a memory, and a program. In the latter case, when the CPU or DSP executes the program using the memory, the CPU or DSP executing the program functions as the unit.

Although the present invention is described in detail in the above, the above description is exemplary in all of the aspects and is not restrictive. It is understood that various other changes and modification can be derived without going out of the present invention.

This application claims a priority based on Japanese Patent Application No. 2018-1897 filed on Jan. 10, 2018, and entitled "Image Display Device And Image Display Method", which is incorporated herein by reference in its entirety.

What is claimed is:

1. An image display device comprising:
   a display panel including a plurality of pixels arranged two-dimensionally and having a uniform resolution;
   an image data conversion unit configured to convert first image data including a plurality of pieces of pixel data, the pixel data being image data corresponding to one pixel, to second image data including a smaller number of pieces of pixel data than the first image data; and
   a drive circuit configured to drive the display panel based on the second image data, wherein
   the display panel has a first region in which one piece of the pixel data is written to one pixel and a second region in which one piece of the pixel data is written to two or more pixels, and has a third region and a fourth region,
   the image data conversion unit is configured to obtain a characterizing value having a fractional part, the characterizing value related to a number of pieces of the pixel data used in an average calculation, with respect to each pixel included in the display panel based on a distance of the pixel from a center or one end of the display panel, and
   the image data conversion unit is configured to perform the average calculation based on the characterizing value on the pixel data of the pixel in the fourth region, and is configured not to perform the average calculation on the pixel data of the pixel in the third region.

2. The image display device according to claim 1, wherein the image data conversion unit is configured to perform the average calculation characterized by a function for obtaining the characterizing value based on the distance, the function being continuous within a range of values that the distance can take.

3. The image display device according to claim 2, wherein the image data conversion unit is configured to perform the average calculation characterized by the function that changes smoothly within the range of values that the distance can take.

4. The image display device according to claim 3, wherein
   the characterizing value obtained by the function is larger than one with respect to a part of the pixels in the first region, and
   the image data conversion unit is configured to perform the average calculation on more than one piece of the pixel data with respect to the part of the pixels in the first region.

5. The image display device according to claim 3, wherein
   the characterizing value obtained by the function is equal to or larger than two with respect to the pixel in the second region, and
   the image data conversion unit is configured to perform the average calculation on two or more pieces of the pixel data with respect to the pixel in the second region.

6. The image display device according to claim 5, wherein
   the characterizing value obtained by the function is equal to or larger than a first number with respect to the pixel in the second region, the first number being a number of pixels to which a same pixel data as that written to the pixel is written, and
   the image data conversion unit is configured to perform the average calculation on the first number of pieces of the pixel data with respect to the pixel in the second region.

7. The image display device according to claim 1, wherein when an integer part of the characterizing value is Ya, the image data conversion unit is configured to perform the average calculation on the pixel data of Ya piece of pixel aligned in a first direction, and the pixel data of first and second pixels adjacent to the Ya piece of pixel in the first direction.

8. The image display device according to claim 7, wherein when the fractional part of the characterizing value is Yb, the image data conversion unit is configured to perform, as the average calculation, a calculation of adding the pixel data of the Ya piece of pixel, a product of the pixel data of the first pixel and (Yb/2), and a product of the pixel data of the second pixel and (Yb/2), and dividing an obtained sum by the characterizing value.

9. The image display device according to claim 1, wherein
   the display panel has the second region, the first region, and the second region aligned in order in a horizontal direction, and
   the image data conversion unit is configured to perform the average calculation on the pixel data of the pixels aligned in the horizontal direction.

10. The image display device according to claim 1, wherein
    the display panel has the second region, the first region, the second region, the first region, and the second region aligned in order in a horizontal direction, and
    the image data conversion unit is configured to perform the average calculation on the pixel data of the pixels aligned in the horizontal direction.

11. The image display device according to claim 1, wherein
    the display panel has the first region in a center portion and has the second region in a surrounding portion, and
    the image data conversion unit is configured to perform the average calculation on the pixel data of the pixels aligned in a horizontal direction, and perform the average calculation on the pixel data of the pixels aligned in a vertical direction.

12. The image display device according to claim 2, wherein the image data conversion unit is configured to perform the average calculation characterized by the function that obtains the characterizing value based on the distance the center of the display panel.

13. The image display device according to claim 2, wherein the image data conversion unit is configured to perform the average calculation characterized by the function that obtains the characterizing value based on the distance from the one end of the display panel.

14. The image display device according to claim 2, wherein the image data conversion unit is configured to perform the average calculation characterized by the function that is different in accordance with a color of the pixel.

15. The image display device according to claim 14, wherein
    the display panel includes a red pixel, a green pixel, and a blue pixel, and
    the function for the blue pixel is different from the function for the red pixel and the function for the green pixel.

16. The image display device according to claim 1, wherein
    the display panel has a fifth region and a sixth region, and
    the drive circuit is configured to write whole of the pixel data to the pixel in the fifth region, and write a part of the pixel data to the pixel in the sixth region.

17. The image display device according to claim 16, wherein the fifth and sixth regions are same as the first and second regions, respectively.

18. An image display method using a display panel including a plurality of pixels arranged two-dimensionally and having a uniform resolution, the method comprising:
- converting first image data including a plurality of pieces of pixel data, the pixel data being image data corresponding to one pixel, to second image data including a smaller number of pieces of pixel data than the first image data; and
- driving the display panel based on the second image data, wherein
- the display panel has a first region in which one piece of the pixel data is written to one pixel and a second region in which one piece of the pixel data is written to two or more pixels, and has a third region and a fourth region,
- in converting, a characterizing value having a fractional part is obtained, the characterizing value related to a number of pieces of the pixel data used in an average calculation, with respect to each pixel included in the display panel based on a distance of the pixel from a center or one end of the display panel, and
- in converting, the average calculation is performed based on the characterizing value on the pixel data of the pixel in the fourth region, and the average calculation is not performed on the pixel data of the pixel in the third region.

\* \* \* \* \*